United States Patent
Kikuchi et al.

(10) Patent No.: US 6,614,763 B1
(45) Date of Patent: Sep. 2, 2003

(54) METHOD OF AND APPARATUS FOR MEASURING NETWORK COMMUNICATION PERFORMANCES, AS WELL AS COMPUTER READABLE RECORD MEDIUM HAVING NETWORK COMMUNICATION PERFORMANCE MEASURING PROGRAM STORED THEREIN

(75) Inventors: Shinji Kikuchi, Kawasaki (JP); Takeshi Aoki, Tama (JP); Tetsuya Okano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/420,557

(22) Filed: Oct. 19, 1999

(30) Foreign Application Priority Data

Feb. 4, 1999 (JP) .......................................... 11-027323

(51) Int. Cl.$^7$ .................................................. H04J 3/14
(52) U.S. Cl. ...................... 370/252; 370/248; 370/241; 370/232; 370/233; 370/234; 370/253; 709/224; 709/225; 709/226; 709/227; 709/228
(58) Field of Search ................................. 370/253, 232, 370/233, 234, 254, 241–252; 709/224–228

(56) References Cited

U.S. PATENT DOCUMENTS

| 5,446,735 | A | * | 8/1995 | Tobagi et al. ............... 370/445 |
| 6,058,102 | A | * | 5/2000 | Drysdale et al. ............ 370/252 |
| 6,269,401 | B1 | * | 7/2001 | Fletcher et al. ............. 709/224 |
| 6,363,056 | B1 | * | 3/2002 | Beigi et al. ................. 370/252 |
| 6,366,563 | B1 | * | 4/2002 | Weldon et al. .............. 370/252 |
| 6,469,986 | B1 | * | 10/2002 | Lecheler et al. ............ 370/252 |

* cited by examiner

Primary Examiner—Wellington Chin
Assistant Examiner—Chuong Ho
(74) Attorney, Agent, or Firm—Staas & Halsey LLP

(57) ABSTRACT

Measurement packets are sent at equi-intervals from a sending unit into a network path. The probing packets are received by a reception unit, which measures the packet transmission time to estimate an available bandwidth of a network path from a parameter Q indicative of a correlation in the packet transmission time between adjacent packets.

35 Claims, 17 Drawing Sheets

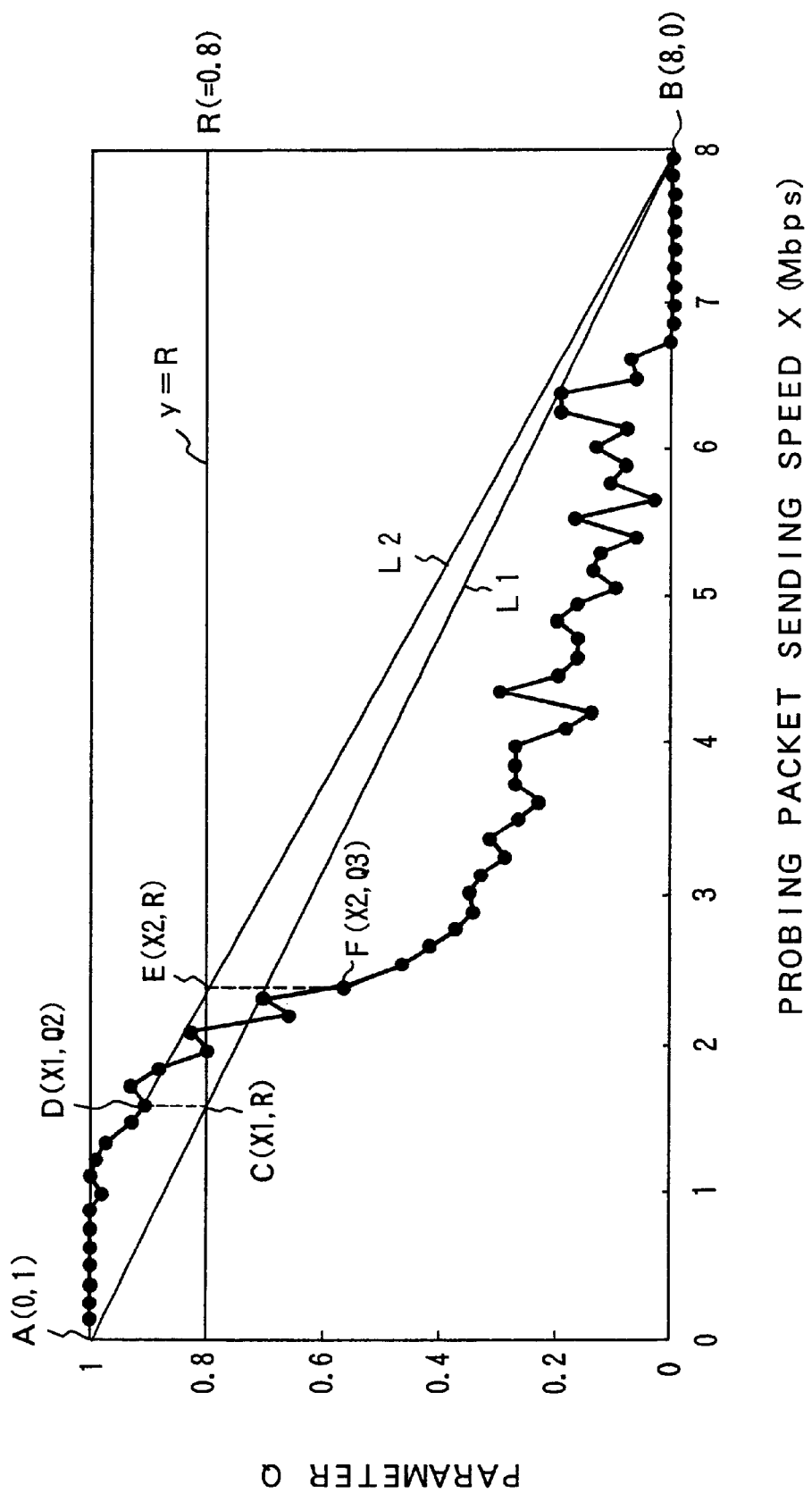

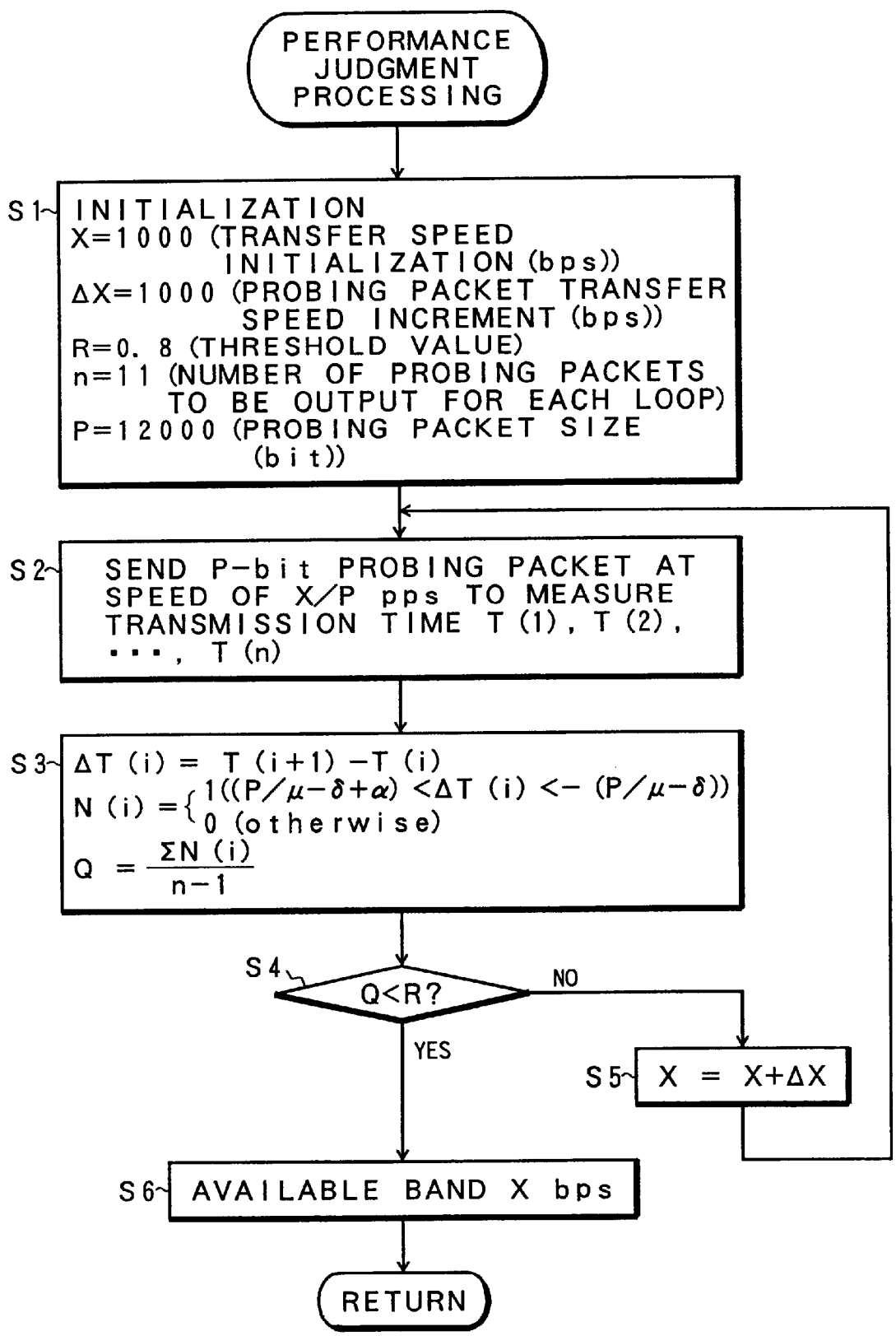

METHOD OF AND APPARATUS FOR MEASURING NETWORK COMMUNICATION PERFORMANCES, AS WELL AS COMPUTER READABLE RECORD MEDIUM HAVING NETWORK COMMUNICATION PERFORMANCE MEASURING PROGRAM STORED THEREIN

BACKGROUND OF THE INVENTION

1. Field of the Invention

The present invention relates generally to a network communication performance measuring method and apparatus using a plurality of probing packets (as used herein, "probing" means issuing packets over networks for the purpose of measurement, and the packets used therefor are referred to as "probing packets") to estimate available bandwidths of network paths, as well as to a computer readable record medium having a therein stored network communication performance measuring program, and more particularly to a network communication performance measuring method and apparatus ensuring an accurate estimation of path available bandwidths by use of a small number of probing packets, as well as to a computer readable record medium in which is stored the network communication performance measuring program.

2. Description of the Related Arts

In the event of providing high degree of services such as wide area load balancing or quality controls in internets or other communication networks, it is critical to measure available bandwidths of network paths to grasp what level of performances can be provided to users. These available bandwidths may differ to a large extent depending on the processing performances of the communication systems used, the processing abilities of routers lying on the communication paths, the line capacities, and the amount of traffics arising from other users. Conventional network performance measuring methods can include a technique in which the available bandwidths are actually measured through sending and reception of a multiplicity of, e.g., as much as 10,000 probing packets or a technique in which the path performances are estimated by a direct use of delay values of the probing packets.

However, in such a known available bandwidth actual measurement method using a multiplicity of probing packets, any excess load may inevitably act on the networks. The available band estimation method by direct use of delay measurement values of the probing packets may also suffer from a deficiency that the measurement errors are apt to become larger due to strongly affecting disturbances caused by other traffics.

SUMMARY OF THE INVENTION

According to the present invention there are provided a method of and an apparatus for measuring a network communication performance, ensuring an accurate estimation of available bandwidths, through sending and reception of a small number of probing packets via a network, without being influenced by any disturbances due to traffics, as well as a computer readable record medium in which is stored a network communication performance measuring program.

The network communication performance measuring method of the present invention comprises:

a sending step in which a sending unit sends a plurality of probing packets at equi-intervals into a network path;

a reception step in which a reception unit receives the plurality of probing packets;

a measurement step in which a measurement unit measures transmission time T(i) from the start of sending of each of the probing packets in the sending step up to the completion of reception of each of the probing packets in the reception step; and an estimation step in which a performance estimation unit estimates an available bandwidth of the network path from correlations in difference between measurement packet transmission times T(i) measured in the measurement step.

It is to be appreciated that although the reception step and the measurement step follow the sending step, they may be processed at the same time during the sending of the plurality of probing packets in the sending step.

According to such a network communication performance measuring apparatus of the present invention, the network available bandwidth can be estimated by observing the correlations between the transmission times of the plurality of probing packets, whereby it is possible to estimate the available bandwidth, by use of a small number of, e.g., 100 to 200 probing packets, with a high accuracy due to lesser influence arising from other traffics.

The estimation step includes determining a ratio of the time during which the measurement packet transmission time exhibits a random behavior and judging, if the ratio is large and therefore the measurement packet is considered to be less influenced by queuing, that the sending speed of the measurement packet is smaller than the available bandwidth of the path, to thereby estimate the relation of magnitude in available bandwidth between the measurement packet and the path. For example, the estimation step includes finding a ratio giving $$(P/\mu - \delta + \alpha) < \Delta T(i) < -(P/\mu - \delta)$$

where P (bit) is a size of the measurement packet, $\delta$ (sec) is a measurement packet sending interval, $\mu$ (bps) is a bottleneck link speed on a path to be measured, $\alpha$ is a constant of the order of 0.001 to 0.0000001, and $\Delta T(i)$ is a difference in transmission time between adjacent probing packets, which is defined as ((i+1)$^{th}$ measurement packet transmission time)–(i$^{th}$ measurement packet transmission time); the estimation step including judging, if the ratio is large with the consideration of the probing packets being less influenced by queuing, that the measurement packet sending speed is smaller than the path available bandwidth, to thereby estimate the relation of magnitude in available bandwidth between the measurement packet and the path.

A variant of the network communication performance measuring method of the present invention comprises:

a sending step for sending a plurality of probing packets at equi-intervals into a network path, the plurality of probing packets being designed to reach a predetermined reception site by way of a single or a plurality of predetermined node(s);

a reception step for receiving the plurality of probing packets at the predetermined reception site;

a measurement step for measuring transmission time from the start of sending of each of the probing packets in the sending step up to the completion of reception of each of the probing packets in the reception step; and an estimation step for estimating a relation of magnitude between a measurement packet sending speed and a path available bandwidth, from correlations between the measurement packet transmission times measured in the measurement step.

In this case as well, the estimation step includes determining a ratio of the time during which the measurement packet transmission time exhibits a random behavior and judging, if the ratio is large and therefore the measurement packet is considered to be less influenced by queuing, that the sending speed of the measurement packet is smaller than the available bandwidth of the path, to thereby estimate the relation of magnitude in available bandwidth between the measurement packet and the path.

Also, the estimation step includes finding a ratio giving $$(P/\mu-\delta+\alpha)<\Delta T(i)<-(P/\mu-\delta)$$

where P (bit) is a size of the measurement packet, $\delta$ (sec) is a measurement packet sending interval, $\mu$ (bps) is a bottleneck link speed on a path to be measured, $\alpha$ is a constant of the order of 0.001 to 0.0000001, and $\Delta T(i)$ is a difference in transmission time between adjacent probing packets, which is defined as ($(i+1)^{th}$ measurement packet transmission time)−($i^{th}$ measurement packet transmission time); the estimation step including judging, if the ratio is large with the consideration of the probing packets being less influenced by queuing, that the measurement packet sending speed is smaller than the path available bandwidth, to thereby estimate the relation of magnitude in available bandwidth between the measurement packet and the path.

Another variant of the network communication performance measuring step of the present invention comprises:

a sending step for sending a plurality of probing packets at equi-intervals into a network path;

a reception step for receiving the plurality of probing packets at the same site on a network from which the probing packets are issued in the sending step or at the near site on the network;

a measurement step for measuring transmission time taken for the probing packets to arrive via a path at and return via the path from a specific node within the network determined by the user; and an estimation step for estimating a relation of magnitude between a measurement packet sending speed and an available bandwidth in reciprocation of the path, from correlations between the measurement packet transmission times measured in the measurement step.

Herein, the estimation step includes finding a ratio giving $$(P/\mu-\delta+\alpha)<\Delta T(i)<-(P-\delta)$$

where P (bit) is a size of the measurement packet, $\delta$ (sec) is a measurement packet sending interval, $\mu$ (bps) is a bottleneck link speed on a path to be measured, $\alpha$ is a constant of the order of 0.001 to 0.0000001, and $\Delta T(i)$ is a difference in transmission time between adjacent probing packets, which is defined as ($(i+1)^{th}$ measurement packet transmission time)−($i^{th}$ measurement packet transmission time); the estimation step including judging, if the ratio is large with the consideration of the probing packets being less influenced by queuing, that the measurement packet sending speed is smaller than the path available bandwidth, to thereby estimate the relation of magnitude in available bandwidth between the measurement packet and the path in reciprocation.

In the network communication performance measuring method of the present invention, the sending step, the reception step, the measurement step and the estimation step are iteratively carried out while varying an initialized transfer speed X (bps) by use of any one of bisection method, regula falsi, monotonically increasing method and monotonically decreasing method, to see whether an available bandwidth of a network path exceeds the transfer speed X (bps) to thereby estimate the available bandwidth of the path. Use of the bisection method or of the regula falsi for example ensures a rapid available width measurement of the order of several seconds.

To estimate the one-way available bandwidth of the reciprocative path up to a specific node on the network, the network communication performance measuring method of the present invention further comprises:

a first estimation step for estimating a first available bandwidth of the network path by the execution of the sending step, the reception step, the measurement step and the estimation step;

a second estimation step for estimating a second available bandwidth of the network path by allowing differently sized packets to flow through its sending path and return path by the execution of the sending step, the reception step, the measurement step and the estimation step; and a third estimation step for estimating a one-way available bandwidth of the network path by judging the state of links within the network path through the comparison of the first and second available bandwidths estimated in the first and second estimation steps.

The third estimation step includes judging whether any half-duplex link exists within the network path and whether the half-duplex link, if any, is bottlenecking therewithin; the third estimation step including, if judgment is made of any one of a) any half-duplex link exists and is bottlenecking within the path;

b) any half-duplex link exists but is not bottlenecking within the path; and c) no half-duplex link exists within the path;
estimating a one-way available bandwidth of the half-duplex link.

For example, the third estimation step includes, if a ratio between the first available bandwidth B1 and the second available bandwidth B2 which are estimated with the measurement packet having a size P not less than 4,993 bits is substantially $$B1/B2=(P+4,992)/2P$$

judging that any half-duplex link exists and is bottlenecking within the network, to thereby make a judgment that 2B1 double the first available bandwidth B1 is a one-way available bandwidth of the path. Alternatively, the third estimation step includes, if $$B1/B2 \neq (P+4,992)/2P$$

judging that any half-duplex link exists but is not bottlenecking within the network path or that no half-duplex link exists within the network path, to thereby make a judgment that the first available bandwidth B1 is a one-way available bandwidth of the path.

The present invention further provides a network communication performance measuring apparatus. The network communication performance measuring apparatus comprises a sending unit for sending a plurality of probing packets at equi-intervals into a network path; a reception unit for receiving the plurality of probing packets sent from the sending unit; a measurement unit for measuring transmission time from the start of sending of each of the probing packets by the sending unit up to the completion of reception of each of the probing packets by the reception unit; and an estimation unit for estimating an available bandwidth of the network path from correlations between measurement packet transmission times measured by the measurement unit.

A variant of the network communication performance measuring apparatus of the present invention comprises a sending unit for sending a plurality of probing packets at equi-intervals into a network path, the plurality of probing packets being designed to reach a predetermined reception site by way of a single or a plurality of predetermined node(s); a reception unit located at the predetermined reception site, for receiving the plurality of probing packets sent from the sending unit; a measurement unit for measuring transmission time from the start of sending of each of the probing packets by the sending unit up to the completion of reception of each of the probing packets by the reception unit; and an estimation unit for estimating a relation of magnitude between a measurement packet sending speed and a path available bandwidth, from correlations between the transmission times of adjacent the probing packets measured by the measurement unit.

Another variant of the network communication performance measuring apparatus of the present invention comprises a sending unit for sending a plurality of probing packets at equi-intervals into a network path; a reception unit located at the same site on a network where the sending unit is located or at the near site on the network, for receiving the plurality of probing packets sent from the sending unit; a measurement unit for measuring transmission time taken for the probing packets to arrive via a path at and then return via the path from a specific node within the network determined by the user; and an estimation unit for estimating a relation of magnitude between a measurement packet sending speed and an available bandwidth in reciprocation of the path, from correlations between the measurement packet transmission times measured by the measurement unit.

Furthermore, the network communication performance measuring apparatus of the present invention executes processings of the sending unit, the reception unit, the measurement unit and the estimation unit while varying an initialized transfer speed X (bps) by use of any one of bisection method, regula falsi, monotonically increasing method and monotonically decreasing method, to see whether an available bandwidth of a network path exceeds the transfer speed X (bps) to thereby estimate the available bandwidth of the path.

The network communication performance measuring apparatus of the present invention further comprises:

a first estimation unit for estimating a first available bandwidth of B1 the network path by the execution of processings of the sending unit, the reception unit, the measurement unit and the estimation unit;

a second estimation unit for estimating a second available bandwidth B2 of the network path by allowing differently sized packets to flow through its sending path and return path by the execution of the sending unit, the reception unit, the measurement unit and the estimation unit; and a third estimation unit for estimating a one-way available bandwidth of the network path by judging the state of links within the network path through the comparison of the first and second available bandwidths B1 and B2 estimated by the first and second estimation units.

The third estimation unit judges whether any half-duplex link exists within the network path and whether the half-duplex link, if any, is bottlenecking therewithin; the third estimation unit, if judgment is made of any one of a) any half-duplex link exists and is bottlenecking within the path;

b) any half-duplex link exists but is not bottlenecking within the path; and c) no half-duplex link exists within the path;

estimating a one-way available bandwidth of the half-duplex link. For example, the third estimation unit, if a ratio between the first available bandwidth B1 and the second available bandwidth B2 which are estimated with the measurement packet having a size P not less than 4,993 bits is substantially $$B1/B2=(P+4,992)/2P$$

judges that any half-duplex link exists and is bottlenecking within the network, to thereby make a judgment that 2B1 double the first available bandwidth B1 is a one-way available bandwidth of the path. Alternatively, the third estimation unit, if $$B1/B2 \neq (P+4,992)/2P$$

judges that any half-duplex link exists but is not bottlenecking within the network path or that no half-duplex link exists within the network path, to thereby make a judgment that the first available bandwidth B1 is a one-way available bandwidth of the path. The other details of the network communication performance measuring apparatus are basically the same as the case of the method.

The present invention also provides a computer readable record medium having a therein stored network communication performance measuring program. The network communication performance measuring program of the record medium comprises a sending module for sending a plurality of probing packets at equi-intervals into a network path; a reception module for receiving the plurality of probing packets sent from the sending module; a measurement module for measuring transmission time from the start of sending of each of the probing packets by the sending module up to the completion of reception of each of the probing packets by the reception module; and an estimation module for estimating an available bandwidth of the network path from correlations between measurement packet transmission times measured by the measurement module. The other variants and details of the computer readable record medium having the therein stored network communication performance measuring program will be the same as in the cases of the method and apparatus.

The above and other aspects, objects, features and advantages of the present invention will become more apparent from the following detailed description with reference to the accompanying drawings.

BRIEF DESCRIPTION OF THE DRAWINGS

FIG. 10 is an explanatory diagram of a specific example, in the case of FIG. 8, of the available band estimation processing using the regula falsi;

FIG. 11 is a flowchart of the available bandwidth estimation processing of the present invention using the monotonically increasing method;

DETAILED DESCRIPTION OF THE PREFERRED EMBODIMENTS

Figure 1:
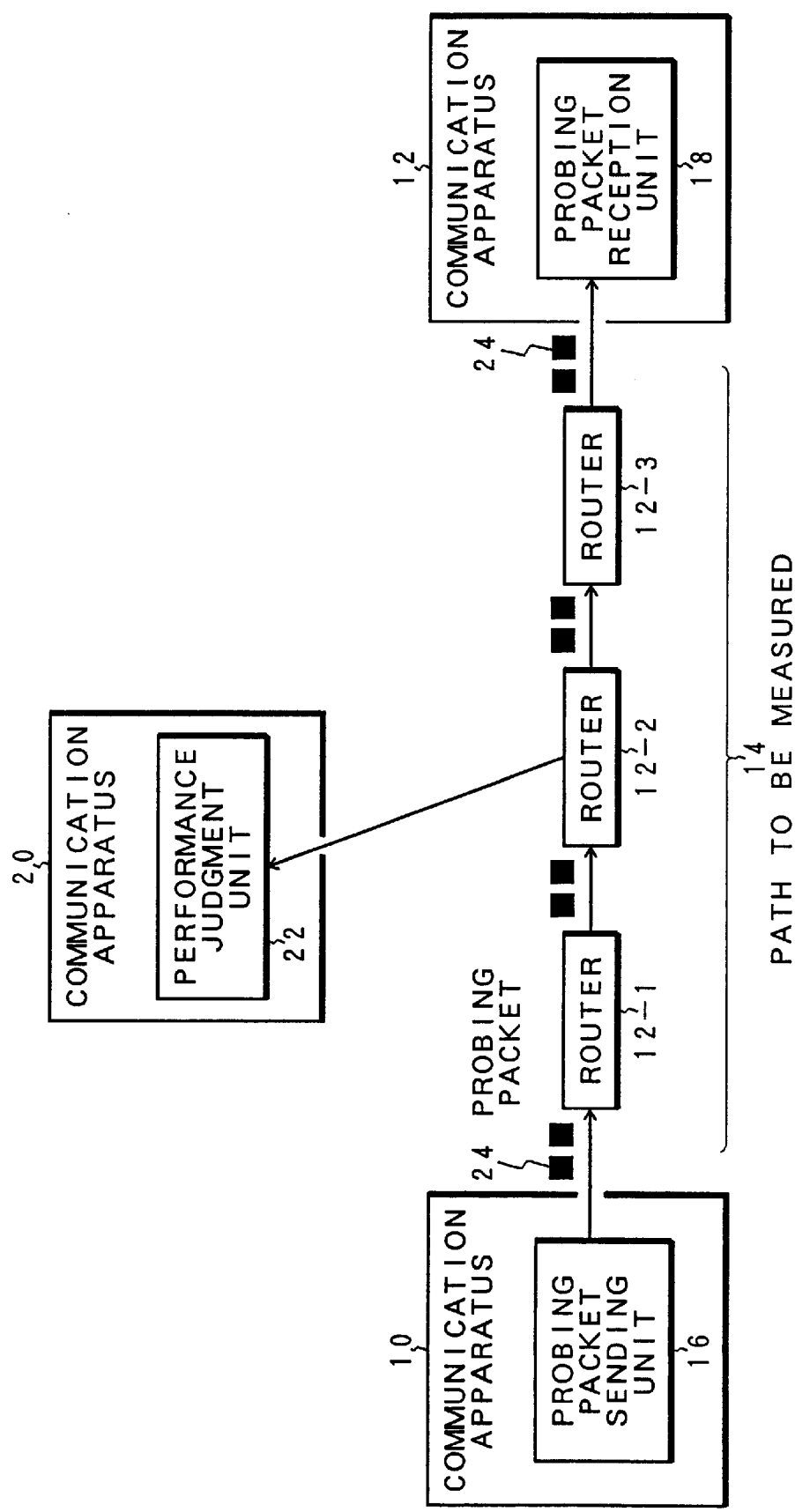
FIG. 1 is an explanatory diagram of a first embodiment of the present invention.

FIG. 1 is a block diagram showing a first embodiment of the present invention. In the case of data sending and reception via an IP network (internet protocol network), the terminal ends of a path 14 are provided with communication apparatuses 10 and 12 between which there are a plurality of routers, e.g., routers 12-1, 12-2 and 12-3. When the path 14 between the communication apparatuses 10 and 12 is a path to be measured, a network performance measuring apparatus of the present invention is constituted of a measurement packet sending unit 16 provided in the communication apparatus 10, a measurement packet reception unit 18 provided in the communication apparatus 12, and a performance judgement unit 22 provided in a communication apparatus 20 placed at any site on a network communicable to the communication apparatuses 10 and 12. The performance judgement unit 22 of the communication apparatus 20 may be provided in the communication apparatus 10 including the measurement packet sending unit 16 or in the communication apparatus 12 including the measurement packet reception unit 18.

Figure 2:
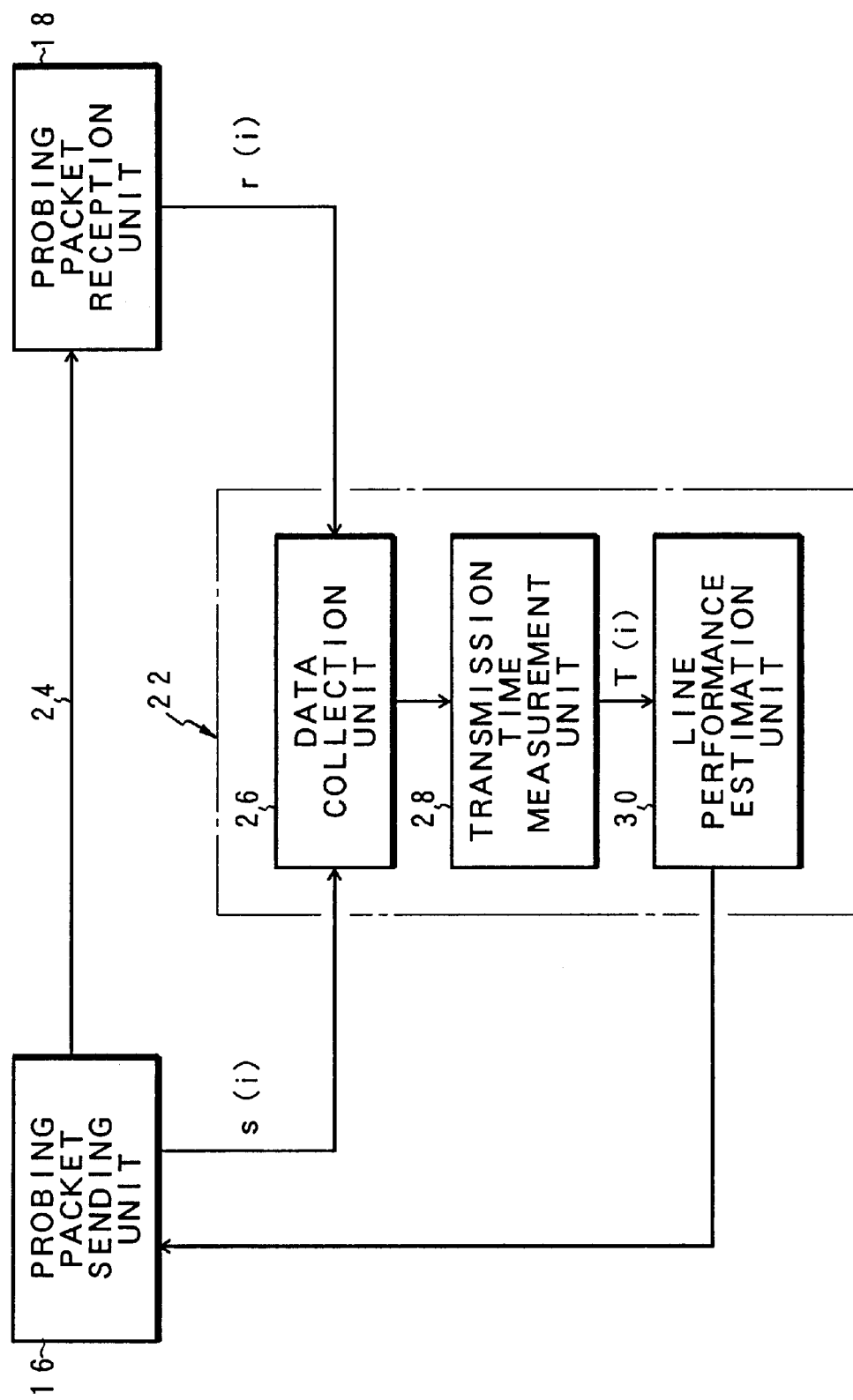
FIG. 2 is a function block diagram of the first embodiment of FIG. 1.

FIG. 2 is a function block diagram of the inventive network performance measuring apparatus in accordance with the first embodiment of FIG. 1. The network performance measuring apparatus of the present invention comprises the measurement packet sending unit 16, the measurement packet reception unit 18 and the performance judgement unit 22. The performance judgement unit 22 is provided with a data collection unit 26, a transmission time measurement unit 28 and a line performance estimation unit 30. The measurement packet sending unit 16 sends a measurement packet 24 at equi-intervals toward the measurement packet reception unit 18. At that time, the measurement packet sending unit 16 records the time s(i) of the sending of the measurement packet 24. As used herein, i represents a packet sequential number, for example i=1, 2, ... n. The measurement packet reception unit 18 records the time r(i) of completion of the reception of the measurement packet 24 sent from the measurement packet sending unit 16. For each of n probing packets sent in a single measurement, the data collection unit 26 provided in the performance judgement unit 22 collects data on time s(i) of start of sending of a measurement packet from the measurement packet sending unit 16 and data on time r(i) of completion of reception of the measurement packet. Using the data collected by the data collection unit 26, the transmission time measurement unit 28 figures out a packet transmission time T(i) taken for the measurement packet 24 from the measurement packet sending unit 16 to reach the measurement packet reception unit 18. On the basis of the packet transmission time T(i) acquired by the transmission time measurement unit 28, the line performance estimation unit 30 judges whether the speed of sending of the measurement packet from the measurement packet sending unit 16 exceeds the available bandwidth of the path.

Figure 3:
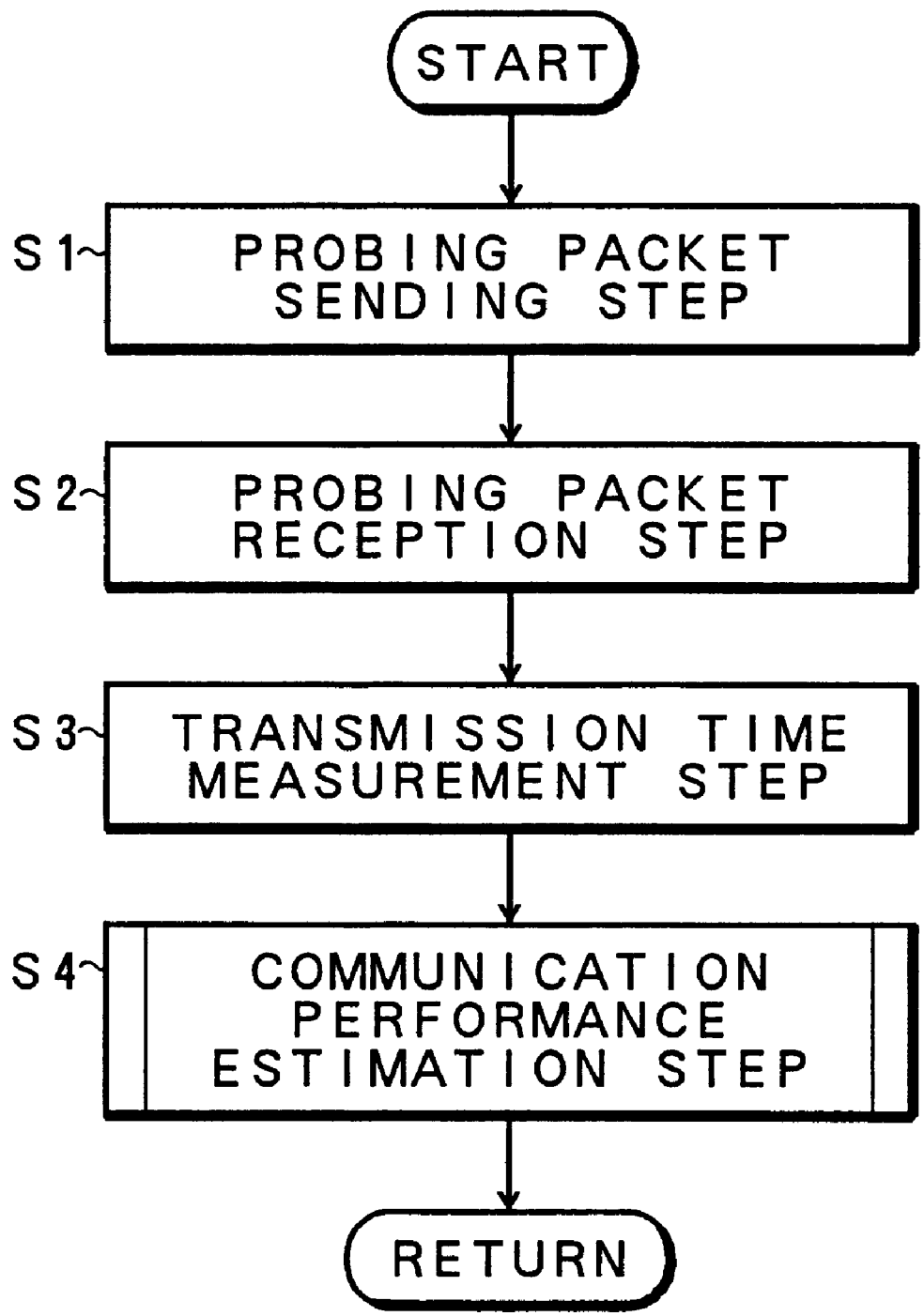
FIG. 3 is a flowchart of network performance measurement processing by use of the present invention.

FIG. 3 is a flowchart of processing procedures based on a network performance measurement processing method in accordance with the present invention, corresponding to the function block diagram of FIG. 2. First, in the sending step of step S1, the measurement packet sending unit 16 sends a plurality of probing packets 24 at equi-intervals to the path to be measured. Correspondingly to the sending of the probing packets, the measurement packet reception unit 18 receives the probing packets in the reception step of step S2. At that time, in the sending step of step S1 the time s(i) of start of the sending is recorded every time a measurement packet is sent, while in the measurement packet reception step of step S2 the time r(i) of completion of the reception of the measurement packet is recorded. In the transmission time measurement step of step S3, on a packet-to-packet basis the packet transmission time T(i) in the path to be measured is figured out from the measurement packet transmission time s(i) and the transmission packet reception completion time r(i) acquired in steps S1 and S2. Then, in the line performance estimation step of step S4, it is judged from data on the transmission time of the plurality of probing packets acquired in the transmission time measurement step of step S3 whether the speed of sending in the measurement packet sending step of step S1 exceeds the available bandwidth of the path to be measured.

Description will then be made of a method of sending and receiving probing packets in the measurement packet sending unit 16 and the measurement packet reception unit 18 in accordance with the first embodiment of FIG. 2, as well as of a method of estimating in the line performance estimation unit 30 the relation of magnitude between the speed of sending of the probing packets from the measurement packet sending unit 16 and the available bandwidth of the path to be measured. The measurement packet sending and receiving method is first described. Assume now that the bottleneck link speed μ (bps) of the path to be measured is a known value. This bottleneck link speed μ (bps) is an available bandwidth when there are no other traffics at all on the path. At a certain interval δ (sec) the measurement packet sending unit 16 sends n probing packets 24 to the measurement packet reception unit 18. The sending interval δ (sec) is a difference between $n^{th}$ measurement packet sending start time and $(n+1)^{th}$ measurement packet sending start time. A UDP packet (user diagram protocol packet) is used as the measurement packet 24. If at that time the measurement packet sending unit 16 designates the measurement packet reception unit 18 as the UDP packet destination address, then the path to be measured is usually a path determined by the routers lying within the network, of the path from the measurement packet sending unit 16 up to the measurement packet reception unit 18. When the probing packets 24 are sent by the measurement packet sending unit 16, each measurement packet is given a sequence number($1 \leq i \leq n$). The measurement packet size is P (bit). Then the measurement packet sending unit 16 records the sending start time s(i) every time it sends each measurement packet. The measurement packet reception unit 18 keeps its port open in order to receive the probing packets 24 sent from the measurement packet sending unit 16. When the measurement packet reception unit 18 receives each measurement packet 24 in such a condition, it records the reception completion time r(i). Any time when the measurement packet sending unit 16 and the measurement packet reception unit 18 perform the sending and reception of the probing packets 24, they send to the data collection unit 26 the sending start time s(i) and the reception completion time r(i) corresponding to the packet sequence number i at that time. The sending of the time data to the data collection unit 26 may collectively be performed after the completion of the transmission of n probing packets 24. The data collection unit 26 sends the thus collected data to the transmission time measurement unit 28. The transmission time measurement unit 28 figures out the packet transmission time T(i) taken for each measurement packet to pass through the path, using $$\Delta T(i) = T(i+1) - T(i)$$

Description will then be made of the method of estimating by the line performance estimation unit 30 the relation of magnitude between the measurement packet sending speed and the available bandwidth of the path to be measured. The line performance estimation unit 30 estimates the relation of magnitude between the path available bandwidth and the measurement packet sending speed, from the measurement packet transmission time T(i) acquired by the transmission time measurement unit 28 and from the sending interval δ (sec) when the measurement packet sending unit 16 sends each measurement packet and from the bottleneck link speed μ (bps) of the path to be measured and the measurement packet size P (bit). The magnitude relation estimating method is as follows. If the sum of the measurement packet sending speed P/δ (bps) and the flow rate I (bps) of other traffic is less than the bottleneck link speed μ (bps), that is, $$(P/\delta + I) < \mu$$

then a smaller number of probing packets can often be stored in the queue of the router resulting in the bottleneck of the network, so that the probing packets may have lesser wait time with in the queue. At that time, a plurality of probing packets are rarely inserted in a successive manner into the queue. The transmission time of the probing packets can vary depending on the number of packets existing within the queue upon the insertion into the queue, although if a single measurement packet exists within the queue at the same time, the behavior of the transmission time of each measurement packet will be independent and at random.

Figure 4:
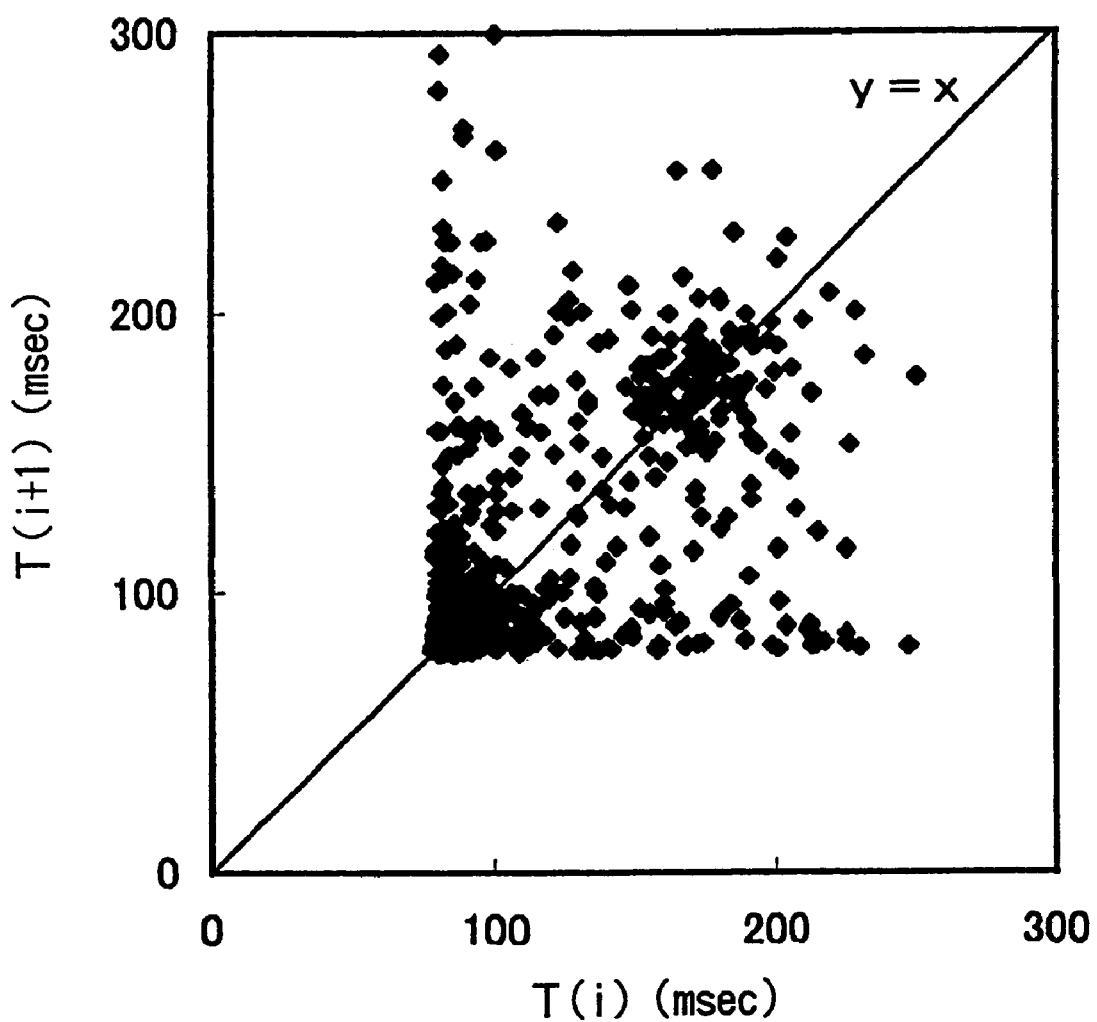
FIG. 4 shows the relation of transmission time between adjacent packets in the case where the other traffic containing measurement packet sending speed (P/ δ+1) is lower than the path bottleneck link speed μ.

This behavior can be seen in FIG. 4. FIG. 4 is a graphic representation with the axis of abscissas representing the transmission time T(i) and with the axis of ordinates representing the transmission time T(i+1) of the next measurement packet, the graph being obtained by plotting the transmission time T(i) of each measurement packet which has been sent at a sufficiently lower speed relative to the available bandwidth of the path. Clearly, the distribution at that time is symmetric with respect to the line y=x. This reveals that the behavior of the packet transmission time T(i) is at random and independent. On the contrary, if the sum of the measurement packet sending speed P/δ (bps) and the flow rate I (bps) of the other traffic is greater than the bottleneck link speed μ (bps), that is, $$(P/\delta + I) > \mu$$

then the number of the packets stored in the queue of the router will increase. Furthermore, if $$(P/\delta + I) > \mu$$

and the link is bottlenecking, then there may occur a collision when the router attempts to output a packet to the link. The collision is a phenomenon in which any packets are not to be output since the network is busy. When there occurs a collision, the packet stands by in the queue for a brief period of time determined at random, after which its transfer is retried. For this reason, the occurrence of the collision may result in an increased waiting time of each packet within the queue of the router. The waiting time within the router queue will increase no matter whether the router is bottlenecking or the link is bottlenecking. When the waiting time within the router queue increases, the measurement packet transmission time does not exhibit its random behavior but instead the following phenomena 1 and 2 may often appear.

Phenomenon 1:

When an $i^{th}$ measurement packet is inserted into the bottlenecked router queue, due to the presence of a large number of packets within the queue the next $(i+1)^{th}$ measurement packet may enter the queue before the $i^{th}$ measurement packet is processed for the output from the queue. As a result of this, the $i^{th}$ and $(i+1)^{th}$ probing packets may be output from the queue in a successive manner.

Phenomenon 2:

A number of traffics may intervene between two probing packets, with the result that the $(i+1)^{th}$ packet transmission time will remarkably increase as compared with the $i^{th}$ packet transmission time.

In the case of the phenomenon 1, let ΔTi be the difference in the transmission time between the $i^{th}$ and $(i+1)^{th}$ packets, that is, $$\Delta T(i) = T(i+1) - T(i)$$

and let P/μ be the time taken for a measurement packet having a size of P(bit) to be processed by the bottlenecking router, then $$\Delta T(i) = T(i+1) - T(i)$$
$$= (r(i+1) - s(i+1)) - (r(i) - s(i))$$
$$= (r(i+1) - r(i)) - (s(i+1) - s(i))$$
$$= P/\mu - \delta$$

will result, so that there appears a correlation between the measurement packet transmission times.

In the case of the phenomenon 2, $$\Delta t(i+1) \geq P/\mu - \delta$$

is established at all times, and hence a number of traffics intervene between the $i^{th}$ and $(i+1)^{th}$ probing packets. If $$\Delta T(i) > -(P/\mu - \delta)$$

then $$\Delta T(i+1) - \Delta T(i) > 0$$

Also, $$\Delta T(i+1) = T(i+2) - T(i+1)$$

hence $$T(i+2) > T(i)$$

Thus, if $$\Delta T(i) > -(P/\mu - \delta)$$

then $$T(i+2) > T(i)$$

will result even in the absence of any intervention of the other traffics between the $(i+1)^{th}$ and $(i+2)^{th}$ packets. In this case as well, therefore, a correlation will appear between the measurement packet transmission times.

Figure 5:
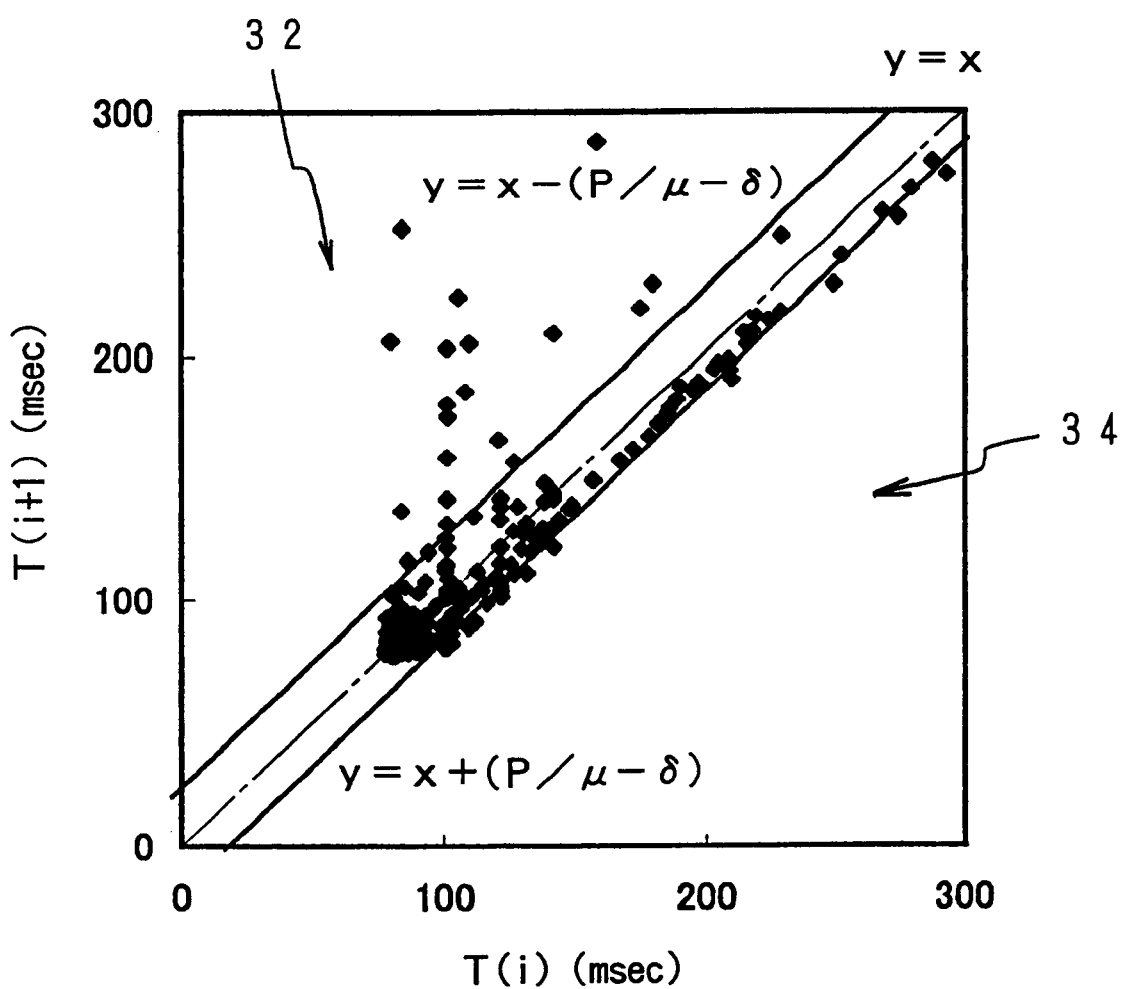
FIG. 5 shows the relation of transmission time between adjacent packets in the case where the other traffic containing measurement packet sending speed (P/δ+1) is higher than the path bottleneck link speed μ.

FIG. 5 illustrates a distribution of the $i^{th}$ transmission time $T(i)$ and the $(i+1)^{th}$ transmission time $T(i+1)$ in the event that the measurement packet sending speed $(P/\delta)$ is sufficiently higher relative to the available bandwidth. It can be seen from FIG. 5 that dissimilar to the case of FIG. 4 where the measurement packet sending speed is sufficiently lower relative to the line available bandwidth, the distribution is asymmetric with respect to the line y=x, with a multiplicity of plotted points lying on the line $$y = x + (P/\mu - \delta)$$

The asymmetry of the plotted point distribution will also be apparent from the fact that some plotted points are present in a region 32 defined by $$y > x - (P/\mu - \delta)$$

but that no plotted points exist in a region 33 defined by $$y < x + (P/\mu - \delta)$$

In this manner, once the measurement packet sending speed $P/\delta$ (bps) exceeds the path available bandwidth $(\mu - I)$ (bps), there will appear a correlation between the measurement packet transmission times as in FIG. 5. Thus, the line performance estimation method of the present invention includes making a check to see if a correlation as in FIG. 5 appears between the measurement time transmission times in order to estimate the relation of magnitude between the measurement packet sending speed $P/\delta$ (bps) and the line available bandwidth $(\mu - 1)$ (bps)

The following parameters are used for the estimation of relation of magnitude:

$$N(i) = \begin{cases} 1\left((P/\mu) - \delta + \alpha\right) < \Delta Ti < -(P/\mu - \delta)\right) \\ 0 \text{ (otherwise)} \end{cases} \quad (1)$$

$$Q = \frac{\sum N(i)}{n - 1}$$

where $\Delta T(i) = T(i+1) - T(i)$, and $\alpha$ is a positive constant which is provided for the exclusion of points lying on the line $y = x + (P/\mu - \delta)$ and which is a value of the order of 0.001 to 0.0000001.

Figure 6:
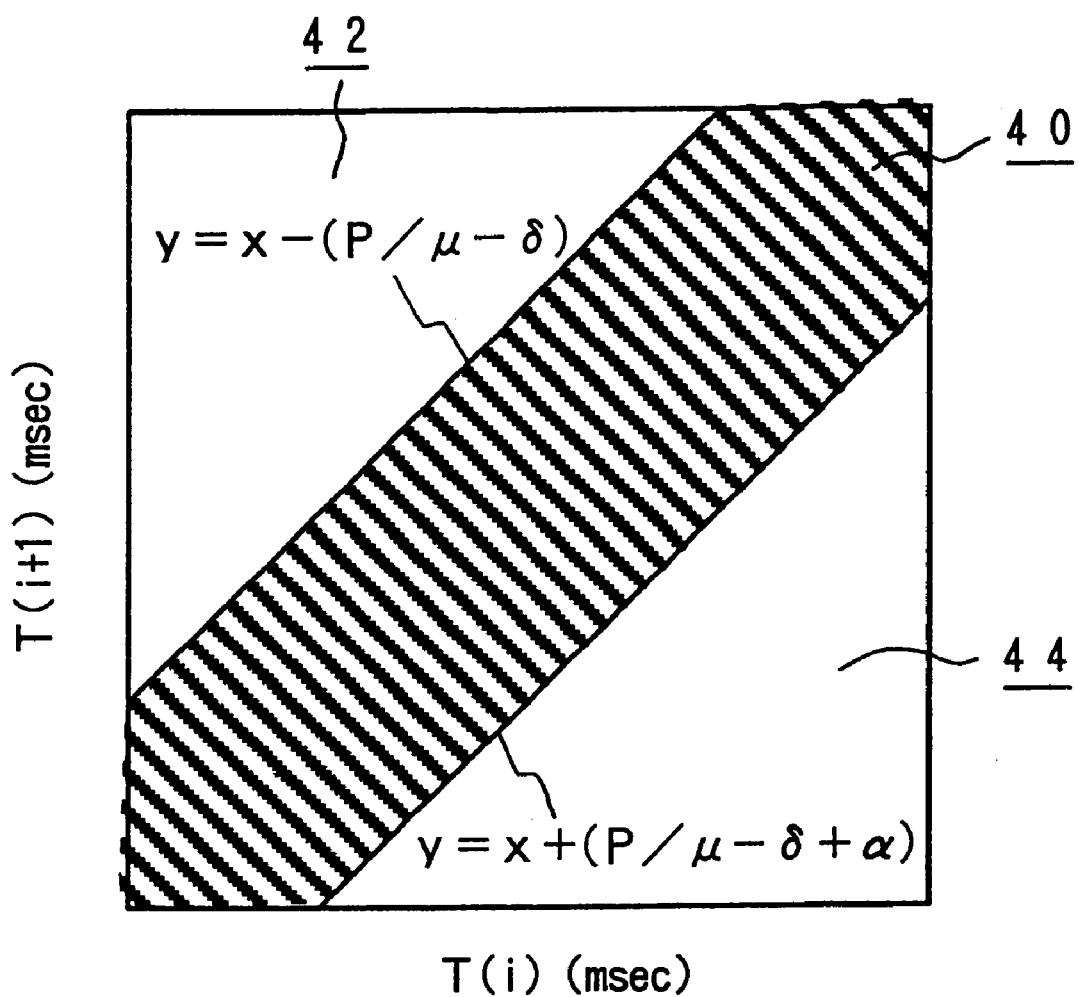
FIG. 6 is an explanatory diagram of a region in which the parameter N(i) for the estimation of available bandwidth results in 1.

Herein, as shown in FIG. 6, the parameter $N(i)$ results in 1 when points plotted by the transmission times $T(i)$ and $T(i+1)$ of adjacent two probing packets lie within a hatched portion 40, but otherwise results in 0. In other words, the parameter $N(i)=1$ is given when it is considered that the measurement packet exhibits a random behavior with a sufficiently lower sending speed relative to the line available bandwidth. Alternatively, the parameter $N(i)=0$ is given in the event of a larger transmission time difference $\Delta T(i)$ or of a successive queuing of the probing packets into the bottle-necked queue. Furthermore, the parameter Q of the expression (1) is a rate of the packet transmission time difference $\Delta T(i)$ giving the parameter $N(i)=1$. Thus, in case the rate of the packet transmission time difference $\Delta T(i)$ giving the parameter $N(i)=1$ is small, the probing packets are influenced by the queuing, with the restricted bandwidth. It can thus be estimated that the measurement packet sending speed $P/\delta$ exceeds the path available bandwidth $(\mu - I)$ (bps). The estimation of the path available bandwidth using the parameter Q includes making a check to see if the parameter Q exceeds a threshold value R, e.g., of the order of 0.8. If $$Q < R$$

then the measurement packet sending speed $P/\delta$ exceeds the path available bandwidth $(\mu - I)$ (bps), that is, $$P/\delta > \mu - I$$

It is thereby estimated that the measurement packet sending speed $P/\delta$ exceeds the available bandwidth $(\mu - I)$ (bps).

Figure 7:
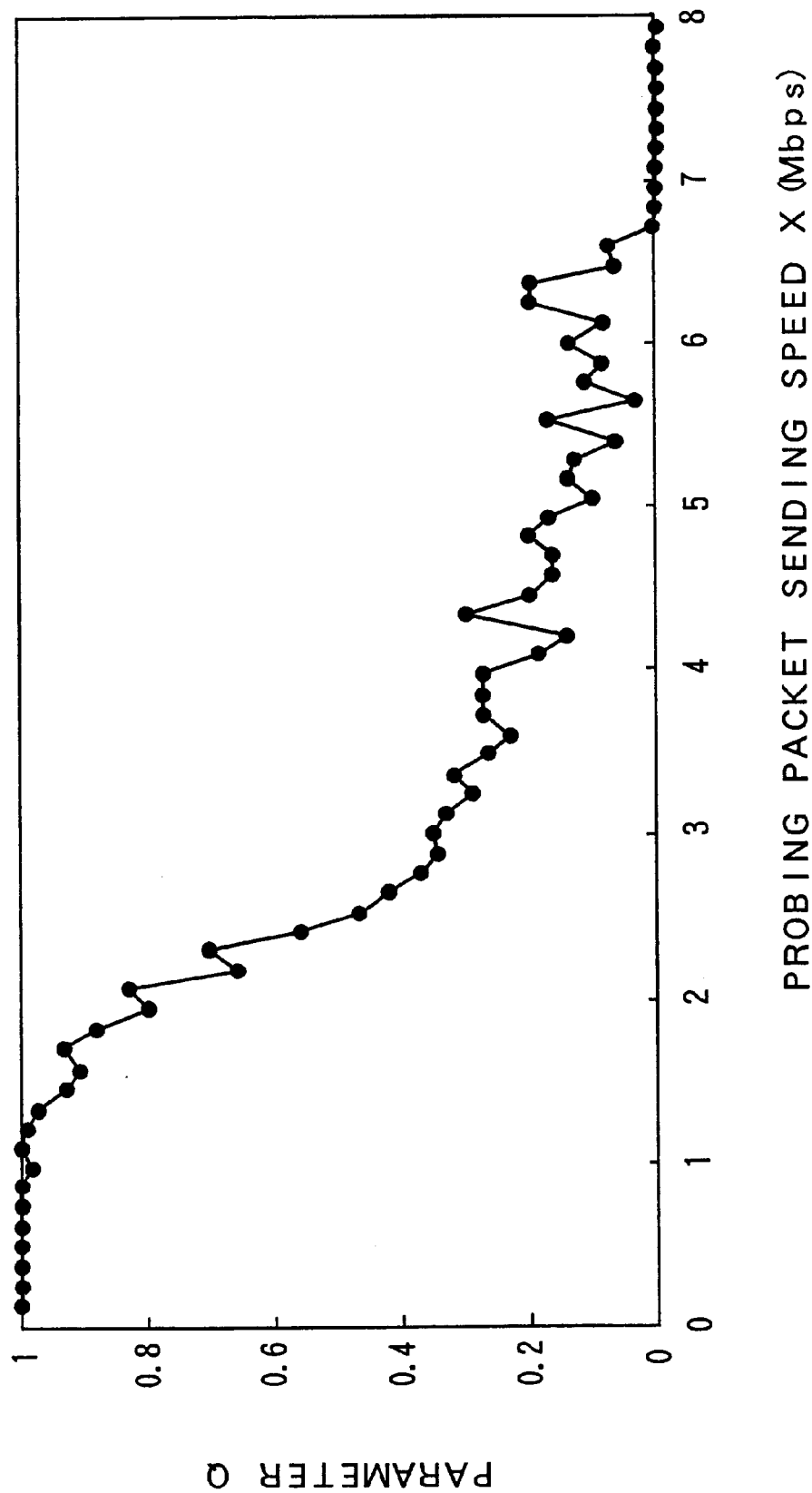
FIG. 7 is an explanatory diagram of the parameter Q acquired by varying the measurement packet sending speed in the reciprocative path having 10 Mbps half-duplex link.

FIG. 7 illustrates a relation between the parameter Q of the expression (1) and the measurement packet sending speed X. The measurement results are shown of the relation between the parameter Q for detecting the available bandwidth and the measurement packet sending speed X (Mbps) when a load of 5 (Mbps) is exerted on a path having a half-duplex link of 10 (Mbps), with the packets reciprocating along the path being sent with varying sending speeds. While the reciprocative available bandwidth of the half-duplex link at that time is $$(10-5)/2 = 2.5 \text{ (Mbps)}$$

it can be seen from the graph that the parameter Q for the detection of the available bandwidth is sharply decreased when the measurement packet sending speed X is in the vicinity of 2 to 3 (Mbps). By using the parameter Q derived from the expression (1) and the threshold value R in this manner, it is possible to check whether the one-way available bandwidth of the network path exceeds the measurement packet sending speed X (bps) The network performance is iteratively checked by the network performance estimation method of the present invention while varying the measurement packet sending speed X (bps) by bisection method, whereby the network available bandwidth can be estimated. The bisection method based estimation is carried out as follows.

I. With the loop counter A=1, set the measurement packet sending speed X (bps) to a predetermined initial value. The loop count is Z.

II. A P-bit measurement packet is output at a packet output speed X/P (pps) to see whether the network path available bandwidth exceeds the packet sending speed X (bps) at that time.

III. If the path available bandwidth exceeds the measurement packet sending speed X (bps), then the measurement packet sending speed X (bps) can further be increased into $$X=X+X/2^A$$

Unless the path available bandwidth exceeds the measurement packet sending speed X (bps), then $$X=X-X/2^A$$

IV. Set the loop counter A to A=A+1. If the loop counter A is less than the loop count Z, then the procedure returns to II. If the loop counter A is not less than the loop count Z, then the procedure terminates, allowing the vicinity of the measurement packet sending speed X (bps) at that time to result in the path one-way available bandwidth. This available bandwidth X (bps) may be represented by the packet output speed X/P (pps).

Figure 8:
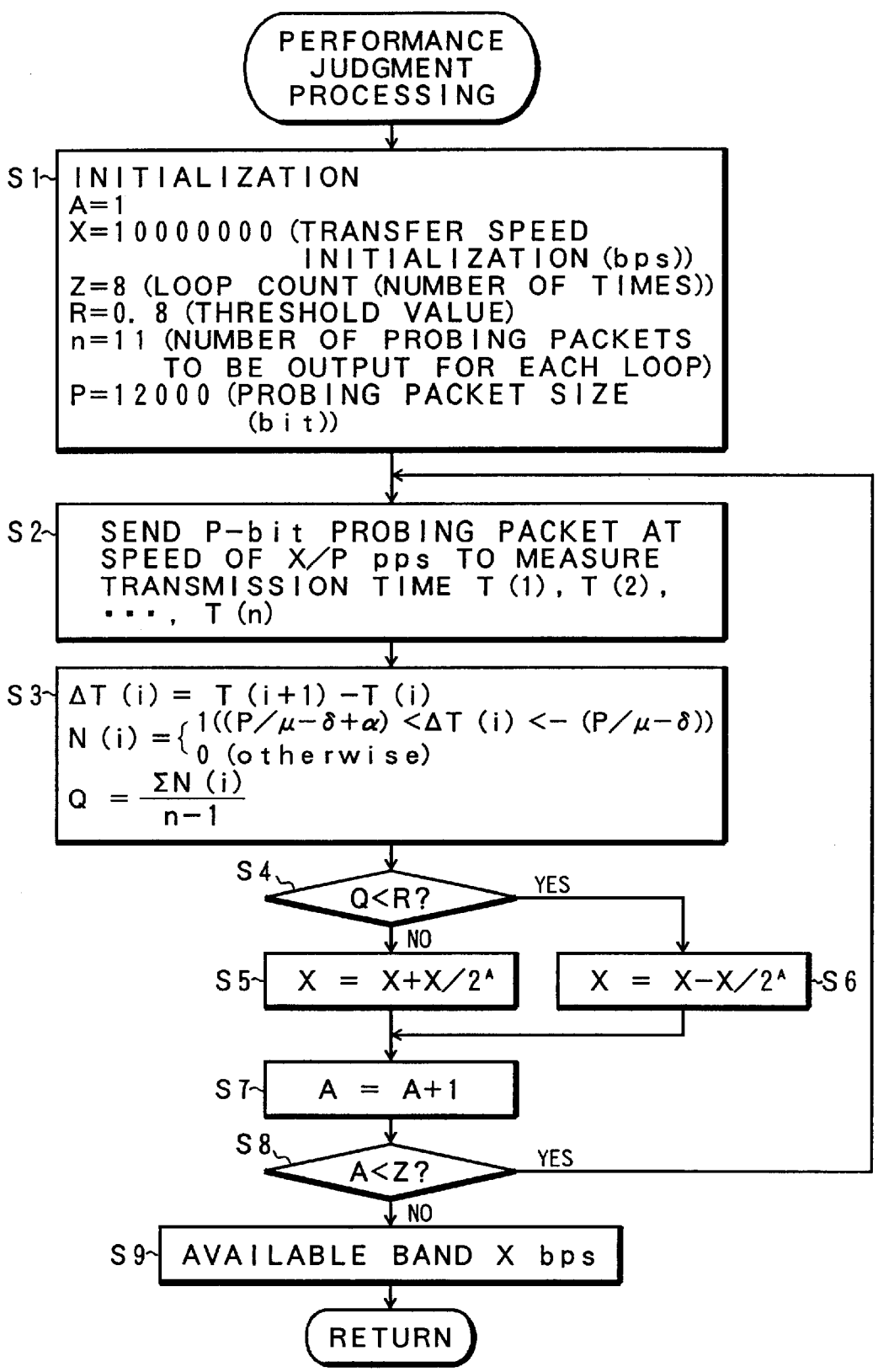
FIG. 8 is a flowchart of the available bandwidth estimation processing of the present invention using the bisection method.

FIG. 8 is a flowchart of the path available bandwidth estimation processing by use of the bisection method. First in step S1, initialization is carried out. The contents of the initialization include setting of the loop counter to A=1, setting of transfer speed initial set value X (bps) to, e.g., X=10,000,000 (bps) in case of 10 Mbps transfer speed Ethernet, setting of the loop count to Z=8, setting to R=0.8 of the threshold value for use in the judgement of the parameter Q for judging whether the measurement packet is queued in the router, setting to n=11 of the number of packets to be output on a loop-to-loop basis, and setting of the measurement packet size to P=12,000 (bit). Then in step S2, n=11 probing packets having the size of P (bit) are sent at a packet output speed X/P (pps) indicative of the number of packets output per unit time, to measure the transmission time T(1), T(2), ... T(n) from the start of sending up to the completion of reception. Then the procedure advances to step S3, in which the difference ΔT in the transmission time between the adjacent probing packets is figured out based on the expression (1), to obtain the parameter N(i) and thereafter the parameter Q. Then in step S4, a check is made to see if the parameter Q acquired in step S3 is less than the threshold value R=0.8. If the parameter Q is not less than the threshold value R, then the measurement packet sending speed X (bps) is less than the path available bandwidth, allowing the sending speed X (bps) to be increased. Thus, in step S5, the measurement packet sending speed X (bps) is increased in compliance with the bisection method. On the contrary, if the parameter Q is less than the threshold value in step S4, then the measurement packet sending speed X (bps) exceeds the path available bandwidth, so that in step S6 the measurement packet sending speed is reduced in compliance with the bisection method. Then in step S7 the loop counter A is incremented by one, after which in step S8 a check is made to see if the value of the loop counter A is less than the loop count Z=8 set in step S1. If it is less than 8 times, then the procedure returns to step S2 to repeat the same processing. After the completion of eight-times measurement packet sending processing, the procedure goes to step S9, in which it is estimated that the measurement packet sending speed X (bps) acquired at that time is the path one-way available bandwidth.

The path available bandwidth estimation according to the present invention could make use of regula falsi. The regular falsi is a solution to the algebraic equation for finding a value "a" giving f(a)=0 with respect to a function f(X) and includes the following procedures.

I. Select initial values of variables X1, X2 so as to give f(X1)≦0, f(X2)>0.

II. Join two points {X1, f(X1)}, {X2, f(X2)} on a X-Y plane by a line L1.

III. Locate the intersection between the X-axis and the line L1 at (X3, 0).

IV. f(X1)×f(X2)<0, hence f(X3) is equal in sign to either f(X1) or f(X2). If f(X3)×f(X1) >0, then X3 is substituted for X1, whereas if f(X3)×f(X2)<0, then X3 is substituted for X2, and the operation II and subsequent operations are iterated. This allows X1 and X2 to gradually converge toward the value "a".

Figure 9A:
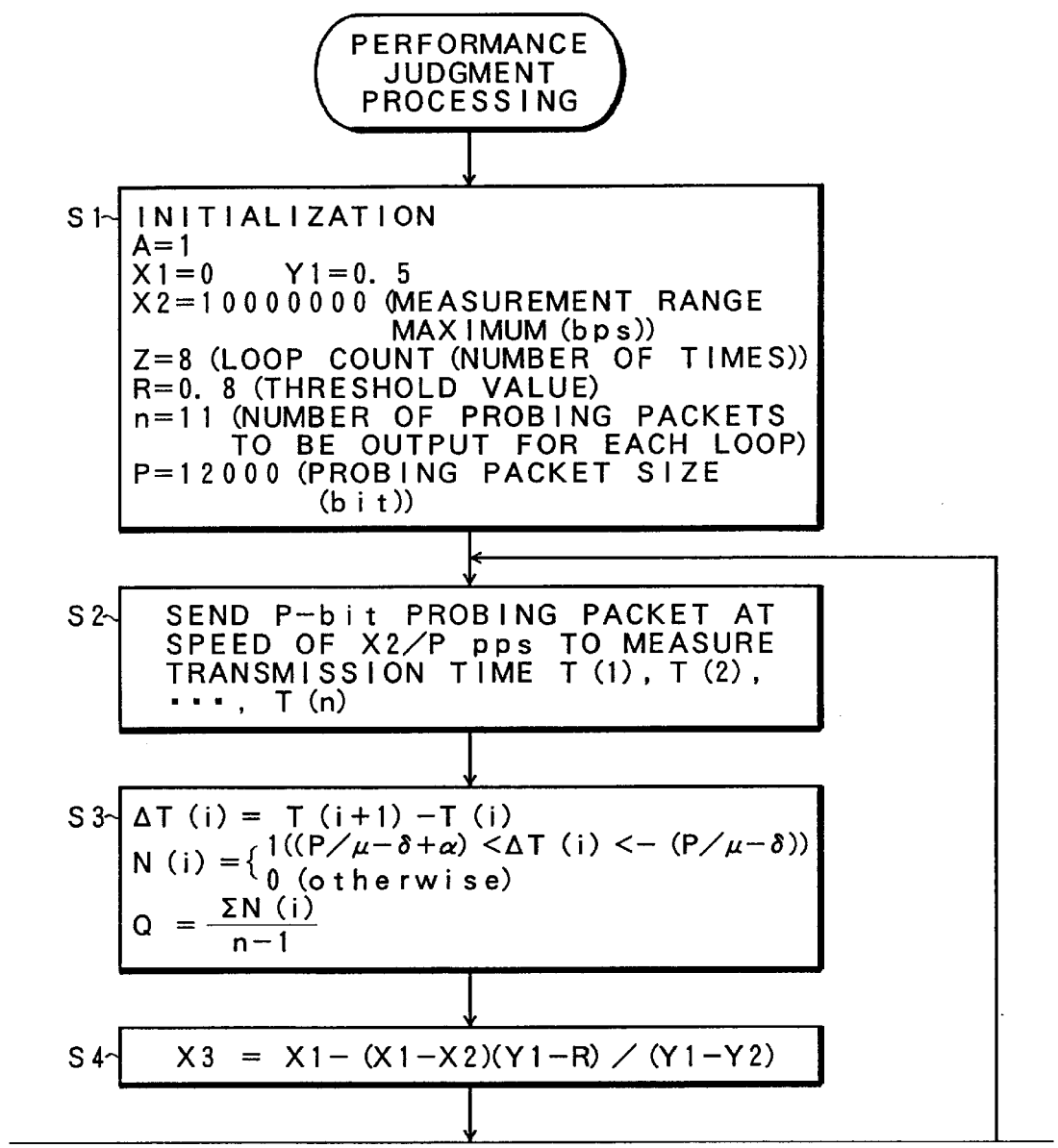
FIGS. 9A and 9B are flowcharts of the available bandwidth estimation processing of the present invention using the regula falsi.
Figure 9B:
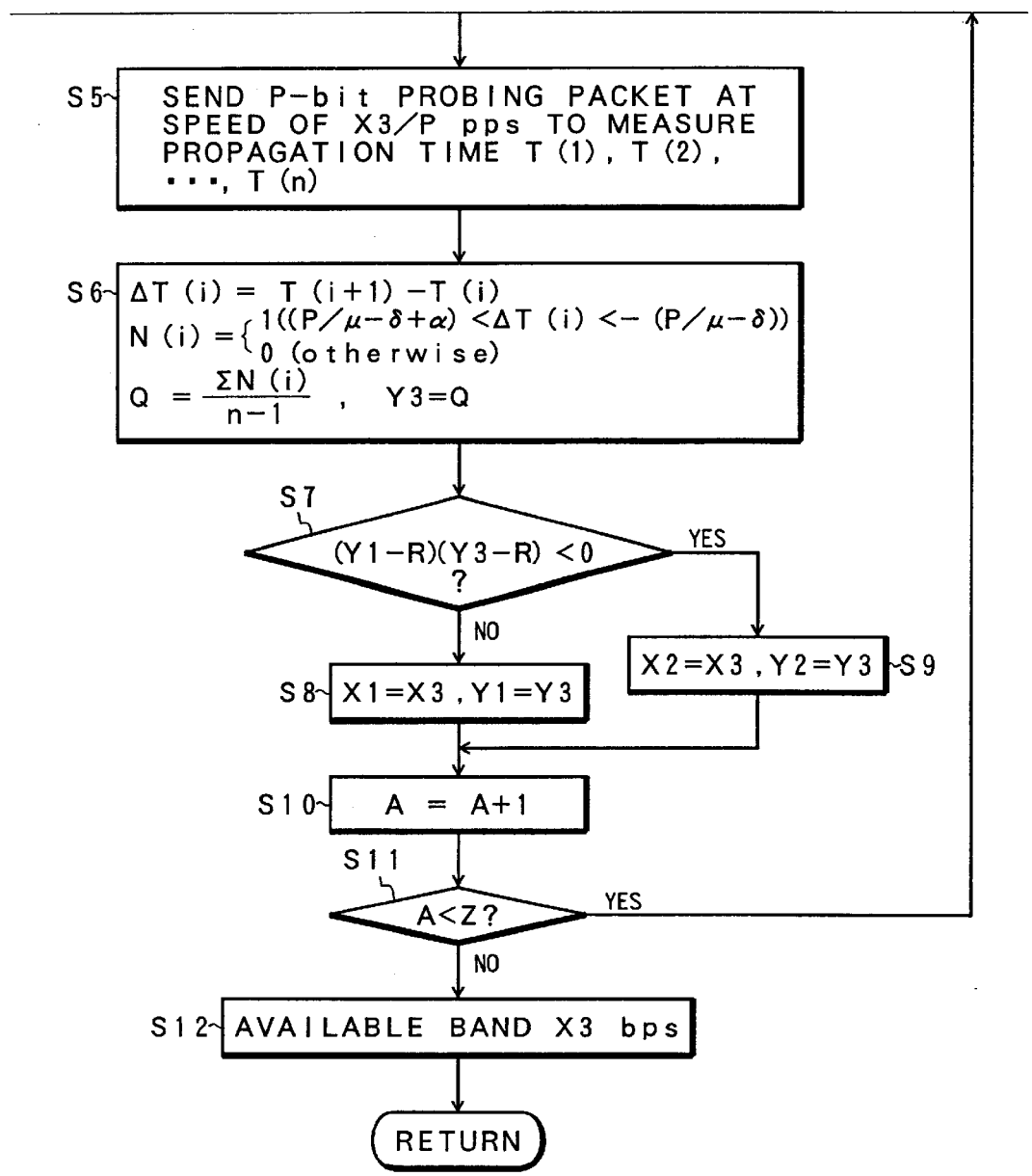

FIGS. 9A and 9B are flowcharts of the performance judgement processing for finding the available bandwidth by use of the regula falsi. First in step S1, initialization is carried out. The contents of the initialization includes, in addition to the parameters of the bisection method shown in FIG. 8, parameters proper to the regula falsi, i.e., X1=0, Y1=0.5 and X2 being the measurement range maximum value (bps). The measurement range maximum value is a value below which the available bandwidth is found to lie with respect to the path to be measured. In the case of Ethernet of 10 (Mbps) transfer speed for example, X2 is set to 10,000,000. The loop count Z is 8 for example. Furthermore, the threshold value R for judging whether the measurement packet is queued the router is set to approx. 0.8. Then in step S2, n=11 probing packets of P-bit size are issued at the packet output speed X2/P (pps) so that the transmission times T(1), T(2), ... T(n) are measured for each measurement packet. Then in step S3, the parameter N(i) is derived from the difference ΔT(i) in the transmission time between the adjacent probing packets on the basis of the expression (3), to eventually obtain the parameter Q. The parameter Q results in Y2 corresponding to the measurement packet sending speed X2. Then in step S4, let (X3, 0) be the coordinate of the intersection between the X-axis and a line obtained by translating the line passing through the coordinates (X1, Y1) and (X2, Y2) on the X-Y plane by−R in the Y-axis direction, then $$X3=X1-(X1-X2)(Y1-R)/(Y1-Y2)$$

Then in step S5, N=11 P-bit probing packets are issued at the newly obtained packet output speed X3/P (pps) to measure the transmission times T(1), T(2), ... T(n). Then in step S6, there are figured out based on the expression (1) the difference ΔT(i) in the transmission time between the adjacent probing packets, the parameter N(i) and the parameter Q, whereupon the parameter Q at that time results in Y3 corresponding to the packet sending speed X3. Then in step S7, if $$(Y1-R)(Y3-R)<0$$

then in step S9, X2=X3 and Y2=Y3 are set, whereas if the step S7 is not established, then in step S8 X1=X3 and Y1=Y3 are set. Then in step S10, the loop counter A is incremented by one, after which in step S1, the processings from the step S4 onward are iterated until the loop counter A reaches the loop count Z=8. As a result of Z=8 times loop processings, the ultimately obtained measurement packet sending speed X3 (bps) at that time is defined as the path available bandwidth in step S12.

With respect to the characteristics of the measurement packet sending speed X and the parameter Q shown in FIG. 7, FIG. 10 specifically depicts the path available bandwidth estimation processing based on the regula falsi of FIGS. 9A and 9B. The procedure for obtaining the measurement packet sending speed X (bps) giving Q=R (provided that R=0.8) based on the regula falsi is as follows.

I. If the available bandwidth of the path to be measured is found to be 8.0 (Mbps) or below, first issue the probing packets at X2=8.0 (Mbps) to obtain the parameter Q1.

II. Draw a line L1 through a point (0, 1) and a point B (8, Q1) and find X1, the X-coordinate value of the intersection C (X1, R) between the line L1 and a line y=R. Issue the probing packets at this sending speed X1 (Mbps) to find the parameter Q2, thereby obtaining a point D (X1, Q2).

III. (1−R) (Q2−R)>0, (Q1−R)>0, (Q1−R) (Q2−R)<0, hence (Q1−R) has a different sign from (Q2−R). Thereby find the intersection E (X2, R) between a line L2 joining a point D (X1, Q2) and the point B (8, Q1) and the line y=R.

IV. Issue the probing packets at the sending speed X2 (Mbps) to find the parameter Q3, thereby obtaining a point F (X2, Q3).

V. (Q2−R) (Q3−R)<0, (Q1−R) (Q3−R)>0, hence (Q2−R) has a different sign from (Q3−R). Thereby find the intersection between the line y=R and a line not shown joining a point F (X2, Q3) and the point A (X1, Q2). Hereinafter, these operations are iterated allowing the measurement packet sending speed to converge at a sending speed giving Q=R.

FIG. 11 is a flowchart for obtaining the available bandwidth by monotonically increasing the measurement packet sending speed. First in step S1, initialization is carried out. In this initialization, the lower value, 1,000 (bps) for example is entered as the transfer speed initial value into the measurement packet transmission speed X (bps). The increment ΔX in the measurement packet output speed is for example 1,000 (bps). Furthermore, the threshold value R for judging whether the packet is queued in the router is set to 0.8, the number n of the probing packets to be output for each loop is set toll, and the size P of the measurement packet is set to 12,000 (bit). Then in step S2, n=11 probing packets each having a size of P (bit) are issued at the packet output speed X/P (pps) to measure the transmission time T(1), T(2), . . . T(n) of each measurement packet. Then in step S3, there are figured out based on the expression (1) the difference ΔT(i) in the transmission time between the adjacent probing packets, the parameters N(i) and Q. Then in step S4, if the parameter Q is less than the threshold value R, the measurement packet sending speed X (bps) is less than the path available bandwidth, and hence in step S5 the measurement packet sending speed X (bps) is increased by ΔX, repeating the processings from step S2 onward. If in step S4 the parameter Q exceeds the threshold value R as a result of such a repetition by the increment ΔX in the measurement packet sending speed X, then the measurement packet sending speed X (bps) at that time exceeds the path available bandwidth, thus allowing the procedure to advance to step S6 in which the measurement packet sending speed X (bps) at that time is defined as the path available bandwidth.

Figure 12:
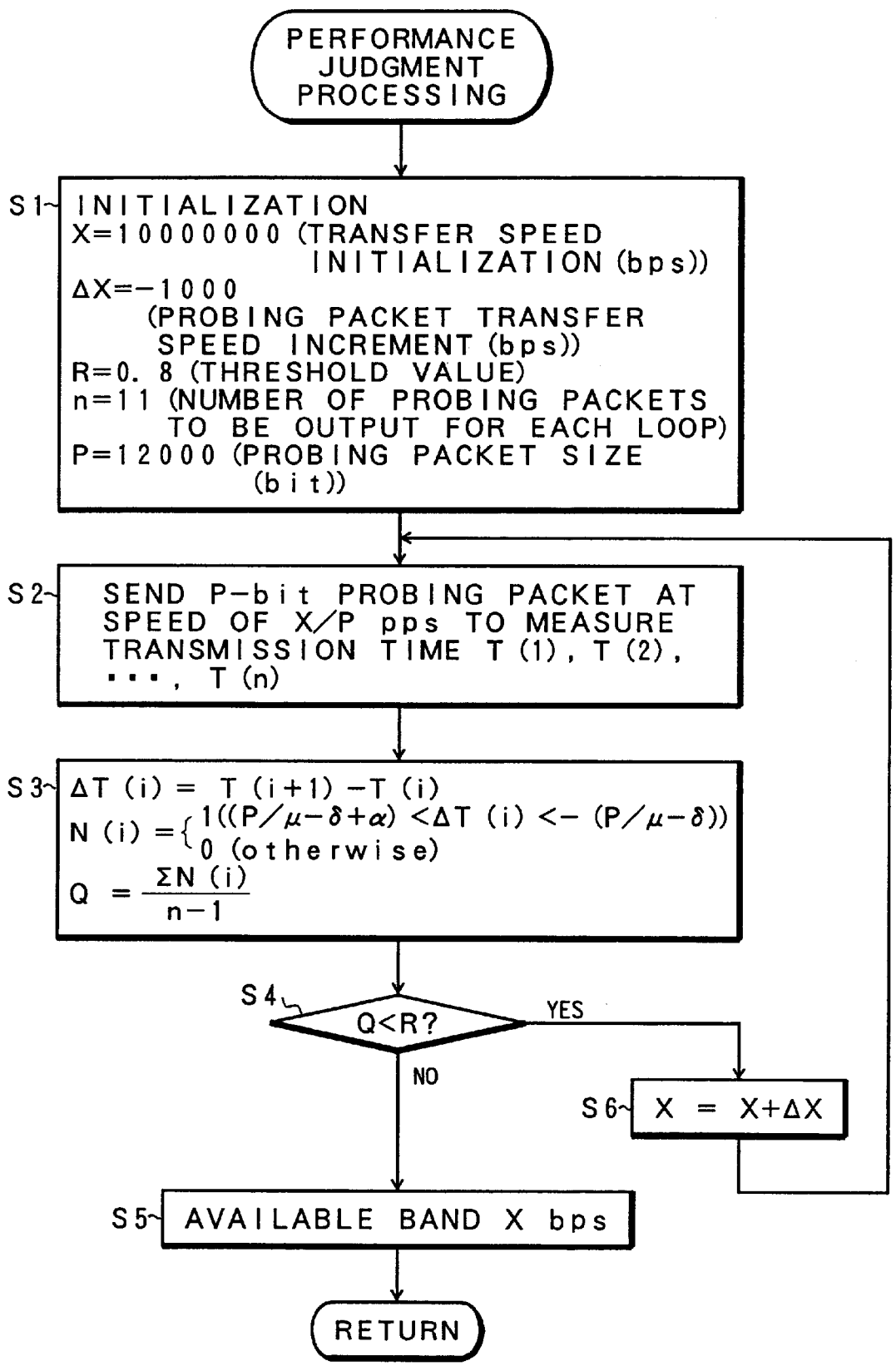
FIG. 12 is a flowchart of the available bandwidth estimation processing of the present invention using the monotonically decreasing method.

FIG. 12 is a flowchart showing the procedure for obtaining the path available bandwidth by varying the measurement packet sending speed with monotonic decrease. In the initialization of step S1, the measurement range maximum value, e.g., 10,000,000 (bps) is set as the initial value of the measurement packet sending speed X (bps). Furthermore, ΔX=−1,000 is set as the output speed increment ΔX used for the monotonic decrease. Others are the same as the case of the monotonic increase of FIG. 11. Then in step S2, n=11 P-bit probing packets are sent at the packet output speed X/P (pps) based on the initialized measurement packet sending speed X (bps), thereby measuring the transmission time T(1), T(2), . . . T(n) of each measurement packet. Then in step S3, there are figured out based on the expression (1) the difference ΔT(i) in the measurement packet transmission time between the adjacent probing packets, the parameter N(i) and the parameter Q. Then in step S4, a check is made to see if the parameter Q is less than the threshold value R. In this case, due to the monotonic decrease, the first parameter Q exceeds the threshold value R, in other words, the measurement packet sending speed X (bps) at that time exceeds the path available bandwidth, so that in step S6 the sending speed X is reduced by the increment ΔX=−1000 (bps), allowing the procedure to return to step S2 to repeat the similar processings. Due to such a monotonic decrease in the measurement packet sending speed X (bps), if the parameter Q becomes less than the threshold value R in step S4, then the sending speed (bps) which has hitherto exceeded the path available bandwidth will enter the available bandwidth, so that in step S5 the measurement packet sending speed X (bps) at that time is defined as the path available bandwidth.

Figure 13:
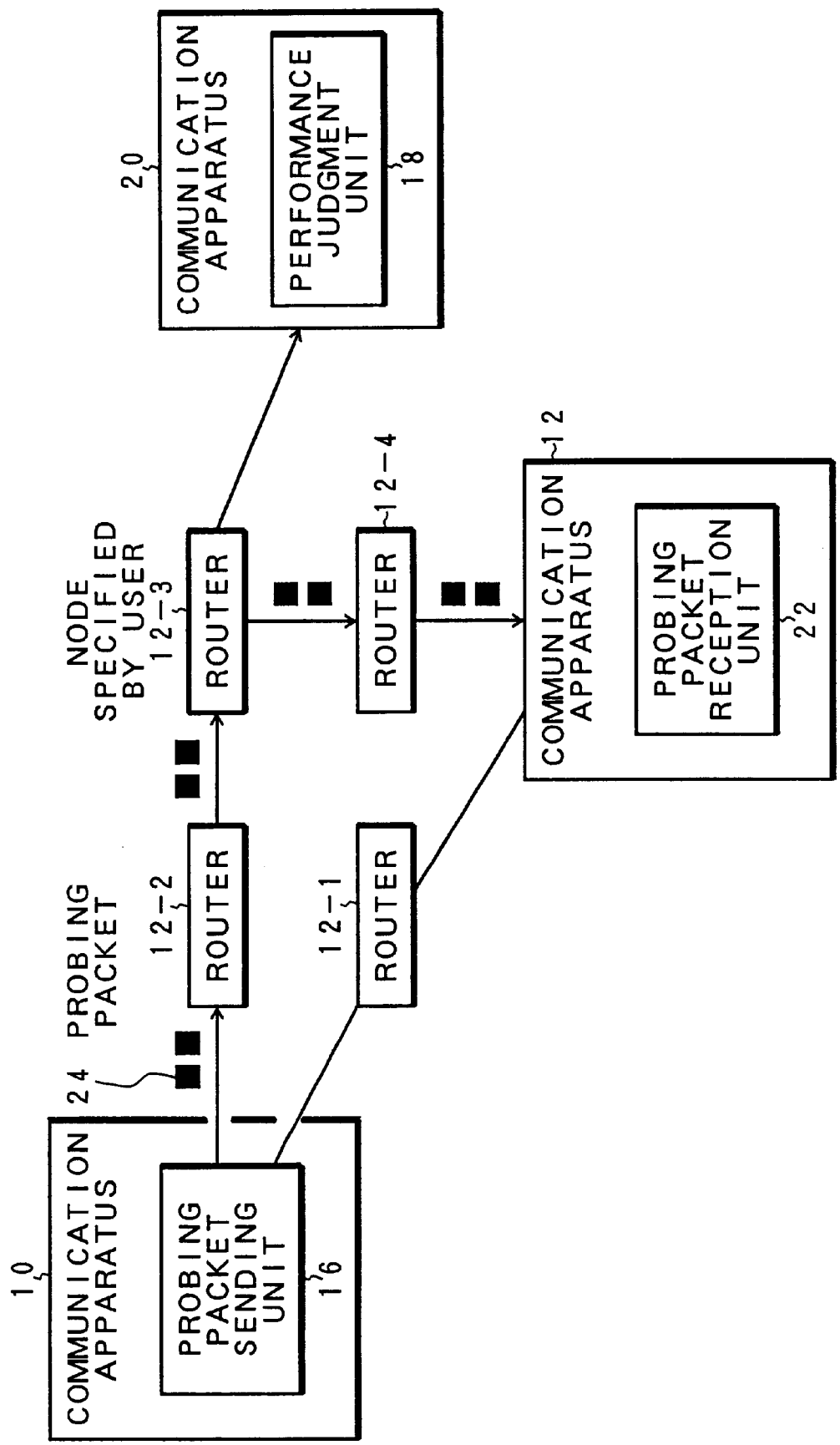
FIG. 13 is an explanatory diagram of a second embodiment of the present invention applied to a path passing through a specific router.

FIG. 13 illustrates a second embodiment of the network communication performance measuring apparatus in accordance with the present invention, which is characterized in that a path passing through a specific router within the network is designated to measure the path available bandwidth. In cases where the communication apparatus 10 associated with a network is provided with the measurement packet sending unit 16 and where the communication apparatus 12 is provided with the measurement packet reception unit 22, a path passing through the router 12-1 for example will be determined by the network if any router is not designated. In contrast with this, the second embodiment of the present invention enables the user to designate a path passing through a specific router 12-3. Providing that it is desired to designate as a path to be measured the path extending from the measurement packet sending unit 16 through the router 12-3 within the network up to the measurement packet reception unit 22, use can be made of e.g., the IP packet source routing option. When a measurement packet is sent from the measurement packet sending unit 16 with the address of a specified router, e.g., the router 12-3 being described on the IP head header as the source routing option, the thus sent measurement packet can reach the measurement packet reception unit 22 by way of the router 12-3 having the specified address. Thus, the measurement target will result in the path extending from the measurement packet sending unit 16 through the specific router 12-3 within the network up to the measurement packet reception unit 22. Herein, the upper limit of the number of the routers capable of being set by the source routing option is seven. This is the same as the first embodiment shown in FIGS. 1 to 12 with the exception of designation of the path passing through a specific router.

Figure 14:
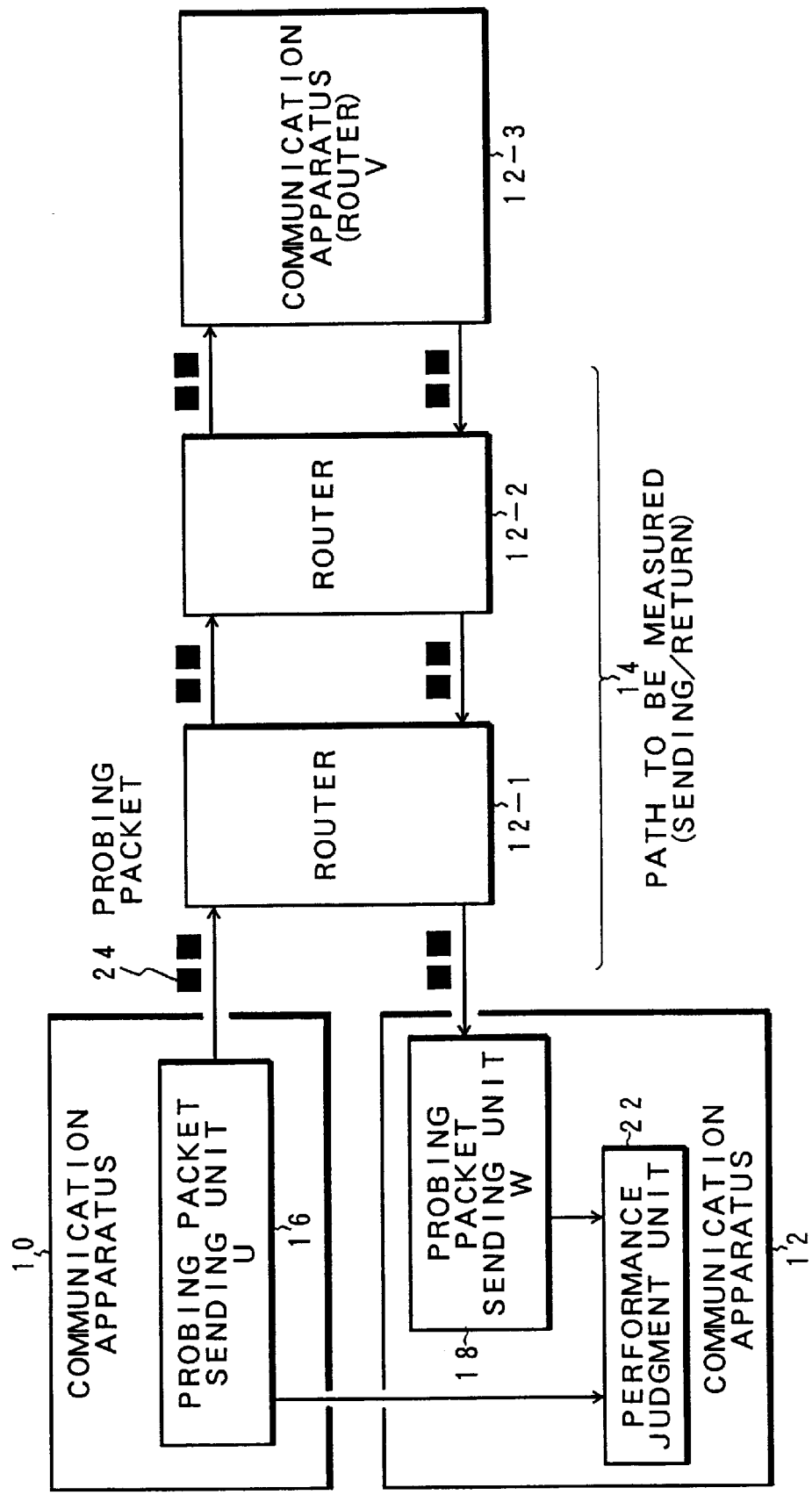
FIG. 14 is an explanatory diagram of a third embodiment of the present invention applied to a reciprocative path.

FIG. 14 illustrates a third embodiment of the network communication performance measuring apparatus in accordance with the present invention. The third embodiment allows the communication apparatuses 10 and 12 which are in close vicinity to each other on the network to include the measurement packet sending unit 16, the measurement packet reception unit 18 and further the performance judgement unit 22. Alternatively, the same communication apparatus on the network could be provided with the measurement packet sending unit 16, the measurement packet reception unit 18 and the performance judgement unit 22. The measurement target path 14 in this case results in any arbitrary path which has a termination ending at the site where the measurement packet sending unit 16 and the measurement packet reception unit 18 are located. It is natural that the performance judgment unit 22 could be placed not only in the communication apparatus 12 provided with the measurement packet reception unit 18 but also in the communication apparatus 10 provided with the measurement packet sending unit 16 and in any communication apparatuses on the network communicable to the communication apparatus 12 provided with the measurement packet reception unit 18. In the event that the measurement packet sending unit 16 and the measurement packet reception unit 18 are located at the same site or at the near sites in this manner, the measurement packet sending unit 16 uses as the measurement target path 14 a sending/return path which is turned back at the communication apparatus 12-3 acting as the terminating node of the measurement target path 14 and which finally returns to the measurement packet reception unit 18, to thereby estimate a one-way available bandwidth.

In cases as in FIG. 14 where the measurement packet sending unit 16 and the measurement packet reception unit 18 are located at the same site or the near sites and where it is desired to measure the performance of the sending/return path from this site up to a certain specified router(e.g., the communication apparatus 12-3), the measurement packet sending unit 16 issues a measurement packet whose destination address is appointed to the router 12-3. The probing packets for use in this purpose can be UDP packets or icmp echo packets. In the event of using the UDP packets, the measurement packet sending unit 16 delivers the UDP packets to a seventh port of the router 12-3. The seventh port of the router 12-3 is called an echo port, the packet sent to the echo port being returned intactly to the sender. In case the router 12-3 receives the icmp echo packet as well, the latter is returned to the sender. In the event of using the icmp echo packet, use can be made of "ping" which is an indication in UNIX or the like. In either case of the UDP packet or the icmp echo packet, the packet sent from the measurement packet sending unit 16 is returned by the router 12-3 and is received by the measurement packet reception unit 18.

Figure 15:
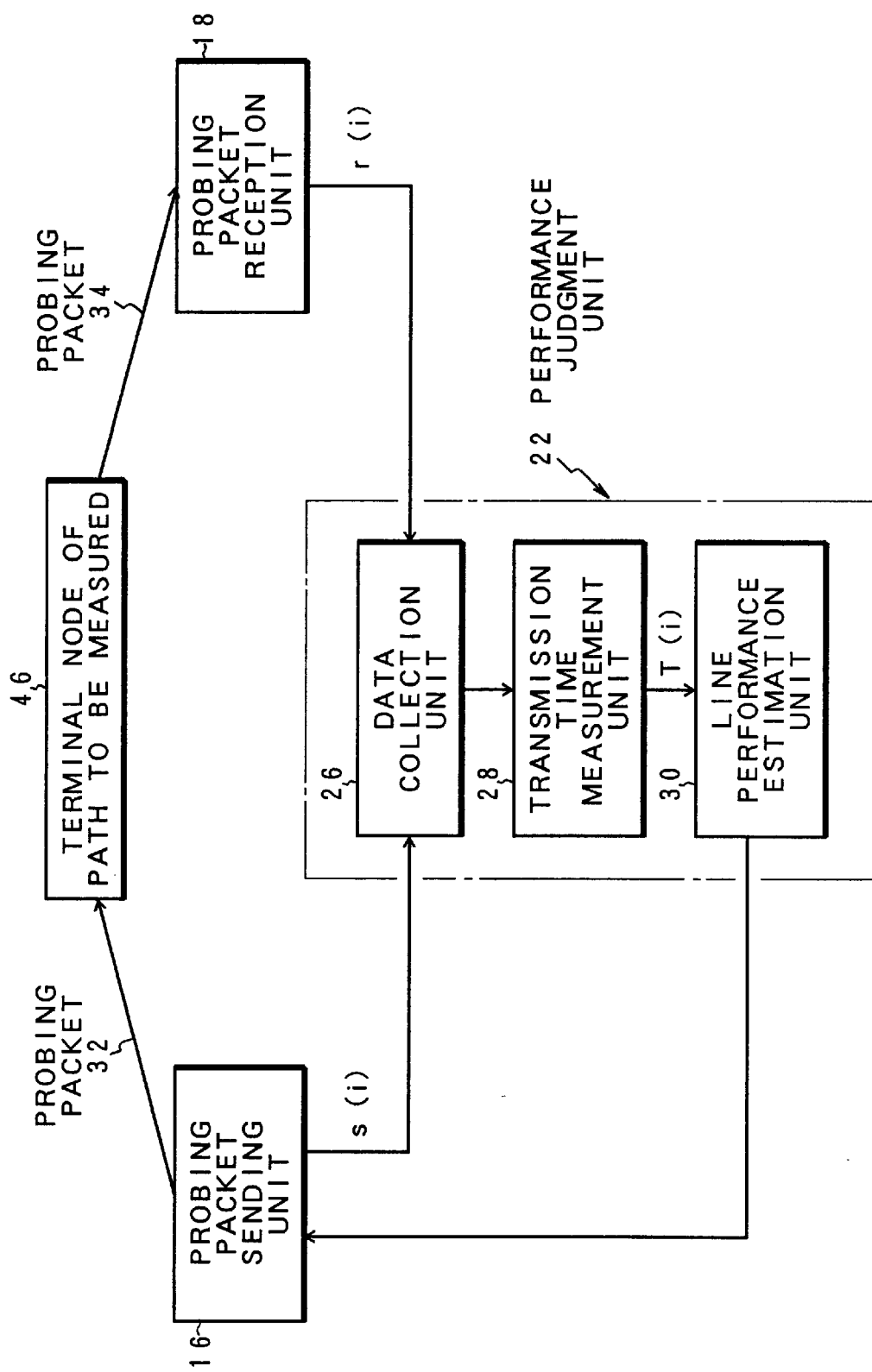
FIG. 15 is a function block diagram of the third embodiment of FIG. 14.

FIG. 15 is a function block diagram of the third embodiment of FIG. 14. In this third embodiment, similar to the first embodiment, the network communication performance measuring apparatus is constituted of the measurement packet sending unit 16, the measurement packet reception unit 18, and the performance judgment unit 22 which includes the data collection unit 26, the transmission time measurement unit 28 and the line performance estimation unit 30. The difference from the first embodiment lies in that a measurement packet 32 is sent from the measurement packet sending unit 16 to a terminal node 46 of the network path to be measured, with a measurement packet 34 being returned to the measurement packet reception unit 18, to thereby measure the performance of the reciprocative path.

Following is a further detailed description. In FIG. 15, now let U, V and W be the measurement packet sending unit 16, the measurement packet reception unit 18 and the router 12-3 resulting in the terminal node on the network, then measurement can be made of the available bandwidth of a path U-W-V. By utilizing the measurement of the available bandwidth of the reciprocative path U-W-V, the one-way available bandwidth of the path, i.e., U-V path available bandwidth is measured by the following techniques. In first measurement processing, the measurement packet sending unit 16, the measurement packet reception unit 18 and the performance judgment unit 22 estimate the path U-W-V available bandwidth B1 (bps) using a P-bit UDP packet as a measurement packet. In this case, the UDP packet for use in the measurement packet is of a size of 4993 bits or more including the header, with the data portion of 4609 bits or more. Then in second estimation processing, the UDP packet having the same size P (bit) as in the first estimation processing is used as the measurement packet, with the Time-To Live (TTL) of the UDP packet being set to the number equal to the hop count of the path 14 to be measured, and with a "icmp time exceeded error" being returned as the return from the router 12-3, to thereby allow the path U-W-V available bandwidth B2 (bps) to be estimated by the measurement packet sending unit 16, the measurement packet reception unit 18 and the performance judgment unit 22. In this case, the hop count of the UDP packet sent as the measurement packet is set to the number obtained by adding 1 to the number of the routers 12-1 and 12-2 located before reaching the terminal end router 12-3. That is, the hop count=2+1=3. If this hop count is set as the UDP packet Time-To-Live (TTL), the TTL is 3 upon the sending from the measurement packet sending unit 16 and is decreased by one every time passing through the routers 12-1 to 12-3, with the result that when reaching the router 12-3, TTL becomes 0 allowing the router 12-3 to be a terminal end, to return an error packet in the form of "icmp time exceeded error". The "icmp time exceeded error" packet is of a size of 4992 bits including the header, which is smaller than the 4993-bit or more UDP packet sent form the measurement packet sending unit 16. Furthermore, a true value of the one-way available bandwidth of the path 14 to be measured is set to Bt (pbs).

For such the first and second estimation processings, the following techniques are used to estimate one-way path U-W available bandwidth.

First, let $\delta1$(sec) and $\delta2$(sec) be the final measurement packet sending interval in the first estimation processing and the final measurement packet sending interval in the second estimation processing, respectively, then $$P/\delta1 = B1$$

$$P/\delta2 = B2$$

Provided that the half-duplex link contained in the path 14 to be measured is bottlenecking and that its one-way path U-W available bandwidth is Bt (bps), then Bt-X (bps) traffic can exist through the return path at the same time when X (bps) traffic exists through the sending path. That is, the total traffic when the packets flow through the sending path and the return path at the same time is given as the sum of the both, which results in the true available bandwidth Bt (bps). Accordingly, in the first and second estimation processings, the relation for the half-duplex link (the number of probing packets flowing through the sending path)+(the number of probing packets flowing through the return path)=available bandwidth an be given in expressions as $$P/\delta1 + P/\delta1 = Bt$$

$$P/\delta2 + 4992/\delta2 = Bt$$

From these expressions, $$\delta2/\delta1 = B1/B2 = (P+4992)/2P$$

is obtained. Therefore, if the relation between the measurement result B1 of the first estimation processing and the measurement result B2 of the second estimation processing is expressed as $$B1/B2=(P+4992)/2P$$

then it is judged that the half-duplex link within the path 14 to be measured is bottlenecking. If it has been judged in this manner that the half-duplex link within the path 14 to be measured is bottlenecking, then the one-way path U-W available bandwidth Bt (bps) becomes double the reciprocative path U-W-V available bandwidth B1 (bps), and hence $$Bt=2B1$$

can be estimated. Alternatively, in the case of other than the condition $$B1/B2=(P+4992)/2P$$

in other words, if any half-duplex link within the path 14 to be measured is not bottlenecking or no half-duplex link exists within the path, then the one-way path U-V available bandwidth Bt (bps) is equal to the reciprocative path U-W-V available bandwidth B1 (bps), with the result that $$Bt=B1$$

can be estimated.

Figure 16:
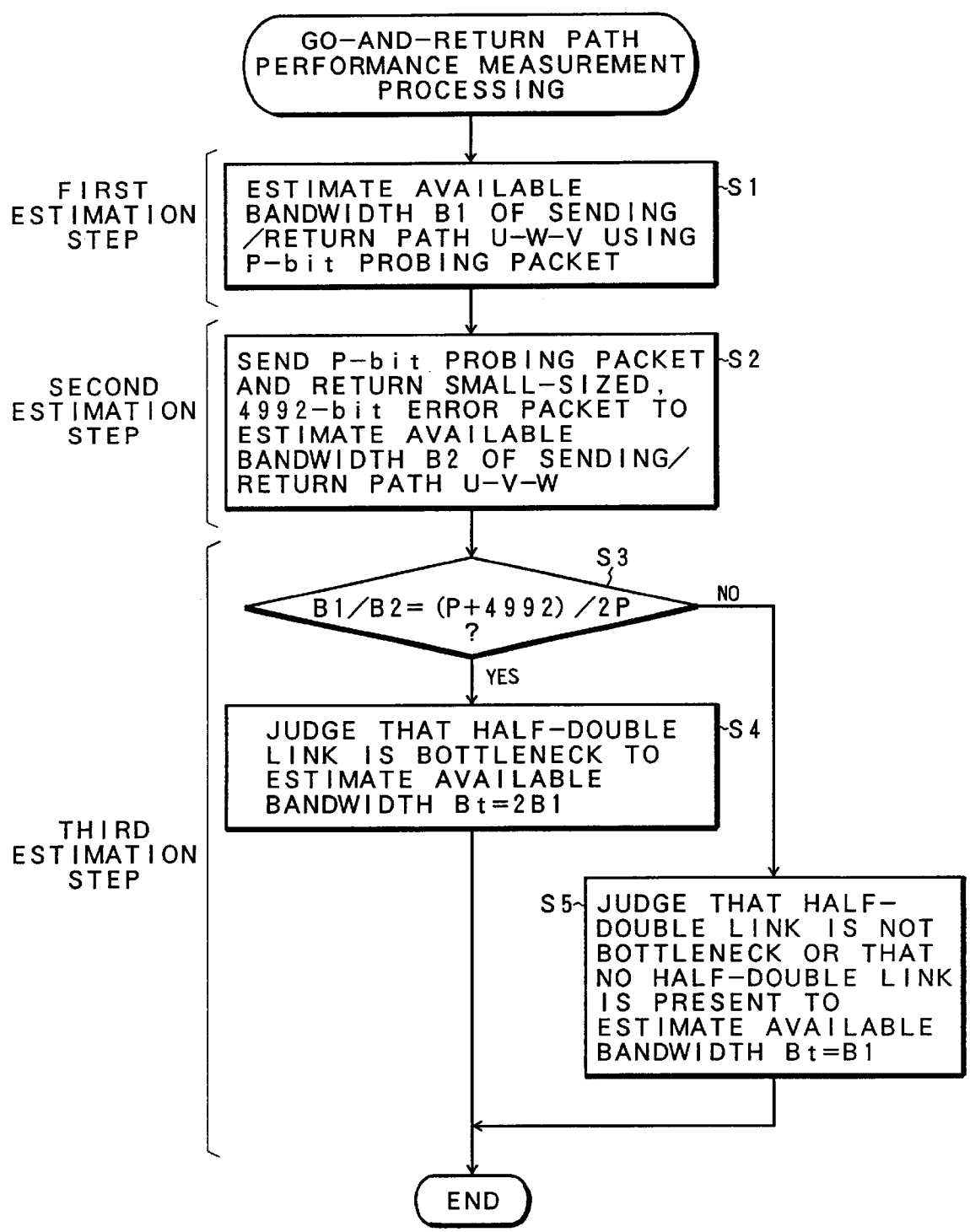
FIG. 16 is a flowchart of the reciprocative path performance measurement processing of FIG. 15.

FIG. 16 is a flowchart of the performance measurement processing for the reciprocative path in the third embodiment of FIG. 14. In the first estimation step of step S1, the reciprocative path U-W-V available bandwidth B1 (bps) is estimated by the techniques of the first embodiment as shown in FIGS. 2 to 12 by use of the probing packets of size P (bit). Then in the second estimation step of step S2, the P-bit measurement packet is sent through the sending path, with an error packet of a smaller size of 4992 bits being returned through the return path, to estimate the reciprocative path U-V-W available bandwidth B2 (bps). The next steps S3, S4 and S5 provide the third estimation step. First in step S3, a check is made to see if the ratio (B1/B2) of the available bandwidths B1 and B2 acquired in the first and second estimation steps is substantially equal to (P+4992)/P. If equal, the procedure goes to step S4 in which it is judged that any half-duplex link exists within the path and makes a bottleneck, allowing the one-way available bandwidth Bt (bps) in this case to be estimated as B1 (bps).

Furthermore, the present invention provides a computer readable record medium having a network communication performance measurement program stored therein. The network communication performance measurement program of this record medium is provided with functions of each unit shown in FIGS. 1 to 16 in the form of program modules. This record medium can be e.g., a removable, transportable storage medium such as a CD-ROM or a floppy disk, a storage device of program providers who provide programs through lines, and a memory device such as a RAM or a hard disk of the program installed processor. The program provided by the record medium is loaded into the processor and is run on its main memory.

According to the present invention as set forth hereinabove, it is possible to precisely estimate the path available bandwidth with a sufficient accuracy by sending and receiving a small number of probing packets. This enables the network performance to be estimated in a brief period of time without imparting any excess load on the network through sending of a multiplicity of probing packets. In the event of "Treno" which is a TCP available bandwidth measurement tool for example, 10,000 or more packets may be used for 20 sec. measurement. On the contrary, the present invention makes use of bisection method or regula falsi for the estimation of the available bandwidth whereby if 20 packets are issued for a single loop so that the available bandwidth is estimated through eight times looping, then the measurement is possible by only 160 packets in total, allowing the network performance to be estimated in a brief period of time without imparting any excess load on the network. Also, the TCP available bandwidth measurement tool "Treno" requires the time enough to repeat the sending and reception of the packets to simulate the behavior of the TCP and enough to vary the window size, this measurement time being at least 10 to 60 seconds. On the contrary, the present invention achieves a rapid measurement of the order of several seconds by using the bisection method or the regula falsi for the estimation of the available bandwidth. Furthermore, the present invention utilizes the correlation of the transmission time between the adjacent probing packets among a plurality of probing packets, thereby achieving measurement results less influenced by disturbance arising from other traffics.

Although the above embodiment has been related by way of example to the case of use of the UDP packets or the icmp echo packets as the probing packets, any other appropriate packets may be used as the probing packets. It is to be appreciated that the present invention is not limited by the numerical values indicated in the above embodiments. Furthermore, the present invention can include any modifications and variants without departing from its spirit and object and without impairing advantages thereof.

What is claimed is:

1. A method of measuring network communication performances, comprising:
   sending a plurality of probing packets at equi-intervals into a network path;
   receiving the plurality of probing packets;
   measuring transmission time from the start of sending of each of the probing packets up to the completion of reception of each of the probing packets; and
   estimating an available bandwidth of the network path from correlations between measurement packet transmission times measured, wherein the estimating comprises:
   determining a ratio of the time during which the measurement packet transmission time exhibits a random behavior; and
   judging, if the ratio is large and therefore the measurement packet is considered to be less influenced by queuing, that the sending speed of the measurement packet is smaller than the available bandwidth of the path, to thereby estimate the relation of magnitude in available bandwidth between the measurement packet and the path.

2. A method according to claim 1, wherein the estimating the available bandwidth further comprises:
   finding a ratio giving $$(P/\mu-\delta+\alpha)<\Delta T(i)<-(P/\mu-\delta)$$

where P (bit) is a size of the measurement packet, $\delta$ (sec) is a measurement packet sending interval, $\mu$ (bps) is a bottleneck link speed on a path to be measured, $\alpha$ is a constant of the order of 0.001 to 0.0000001, and $\Delta T(i)$ is a difference in transmission time between adjacent probing packets, which is defined as ((i+1)$^{th}$ measurement packet transmission time)−(i$^{th}$ measurement packet transmission time); and judging, if the ratio is large with the consideration of the probing packets being less influenced by queuing, that the measurement packet sending speed is smaller than the path available bandwidth, to thereby estimate the relation of magnitude in available bandwidth between the measurement packet and the path.

3. A method according to claim 1, wherein
the sending, the receiving, the measuring, and the estimating the available bandwidth are iteratively carried out while varying an initialized transfer speed X (bps) by use of any one of bisection method, regula falsi, monotonically increasing method and monotonically decreasing method, to see whether an available bandwidth of a network path exceeds said transfer speed X (bps) to thereby estimate the available bandwidth of the path.

4. A method according to claim 3, further comprising:
estimating a first available bandwidth of the network path by the execution of the sending, the receiving, the measuring, and the estimating the available bandwidth;
estimating a second available bandwidth of the network path by allowing differently sized packets to flow through its sending path and return path by the execution of the sending, the receiving, the measuring, and the estimating the available bandwidth; and
estimating a one-way available bandwidth of the network path by judging the state of links within the network path through the comparison of the first and second available bandwidths estimated.

5. A method according to claim 4, wherein the estimating the one-way available bandwidth comprises:
judging whether any half-duplex link exists within the network path and whether the half-duplex link, if any, is bottlenecking therewithin; and
estimating a one-way available bandwidth of the half-duplex link if judgment is made of any one of
a) any half-duplex link exists and is bottlenecking within the path;
b) any half-duplex link exists but is not bottlenecking within the path; and
c) no half-duplex link exists within the path.

6. A method according to claim 5, wherein the estimating a one-way available bandwidth further comprises:
if a ratio between the first available bandwidth B1 and the second available bandwidth B2 which are estimated with the measurement packet having a size P not less than 4,993 bits is substantially $$B1/B2=(P+4,992)/2P,$$

judging that any half-duplex link exists and is bottlenecking within the network, to thereby make a judgment that 2B1 double the first available bandwidth B1 is a one-way available bandwidth of the path; and
if $$B1/B2(P+4,992)/2P,$$

judging that any half-duplex link exists but is not bottlenecking within the network path or that no half-duplex link exists within the network path, to thereby make a judgment that the first available bandwidth B1 is a one-way available bandwidth of the path.

7. A method of measuring network communication performances, comprising:
sending a plurality of probing packets at equi-intervals into a network path, the plurality of probing packets being designed to reach a predetermined reception site by way of a single or a plurality of predetermined node(s);
receiving the plurality of probing packets at the predetermined reception site;
measuring transmission time from the start of sending of each of the probing packets in the sending up to the completion of reception of each of the probing packets in; and
estimating a relation of magnitude between a measurement packet sending speed and a path available bandwidth, from correlations between the measurement packet transmission times measured, wherein the estimating comprises:
determining a ratio of the time during which the measurement packet transmission time exhibits a random behavior; and
judging, if the ratio is large and therefore the measurement packet is considered to be less influenced by queuing, that the sending speed of the measurement packet is smaller than the available bandwidth of the path, to thereby estimate the relation of magnitude in the available bandwidth between the measurement packet and the path.

8. A method according to claim 7, wherein the estimating further comprises:
finding a ratio giving $$(P/\mu-\delta+\alpha)<\Delta T(i)<-(P/\mu-\delta)$$

where P (bit) is a size of the measurement packet, $\delta$ (sec) is a measurement packet sending interval, $\mu$ (bps) is a bottleneck link speed on a path to be measured, $\alpha$ is a constant of the order of 0.001 to 0.0000001, and $\Delta T(i)$ is a difference in transmission time between adjacent probing packets, which is defined as $((i+1)^{th}$ measurement packet transmission time$)-(i^{th}$ measurement packet transmission time); and
judging, if the ratio is large with the consideration of the probing packets being less influenced by queuing, that the measurement packet sending speed is smaller than the path available bandwidth, to thereby estimate the relation of magnitude in available bandwidth between the measurement packet and the path.

9. A method according to claim 7, wherein the sending, the receiving, the measuring, and the estimating are iteratively carried out while varying an initialized transfer speed X (bps) by use of any one of bisection method, regula falsi, monotonically increasing method and monotonically decreasing method, to see whether an available bandwidth of a network path exceeds the transfer speed X (bps) to thereby estimate the available bandwidth of the path.

10. A method according to claim 9, further comprising:
estimating a first available bandwidth of the network path by the execution of the sending, the receiving, the measuring, and the estimating;
estimating a second available bandwidth of the network path by allowing differently sized packets to flow through its sending path and return path by the execution of the sending, the receiving, the measuring, and the estimating; and
estimating a one-way available bandwidth of the network path by judging the state of links within the network path through the comparison of the first and second available bandwidths.

11. A method according to claim 10, wherein the estimating the one-way available bandwidth comprises:
  judging whether any half-duplex link exists within the network path and whether the half-duplex link, if any, is bottlenecking therewithin; and
  estimating a one-way available bandwidth of the half-duplex link if judgment is made of any one of
    a) any half-duplex link exists and is bottlenecking within the path;
    b) any half-duplex link exists but is not bottlenecking within the path; and
    c) no half-duplex link exists within the path.

12. A method according to claim 10, wherein the estimating a one-way available bandwidth further comprises:
  if a ratio between the first available bandwidth B1 and the second available bandwidth B2 which are estimated with the measurement packet having a size P not less than 4,993 bits is substantially $$B1/B2=(P+4,992)/2P,$$

judging that any half-duplex link exists and is bottlenecking within the network, to thereby make a judgment that 2B1 double the first available bandwidth B1 is a one-way available bandwidth of the path; and
  if $$B1/B2(P+4,992)/2P,$$

judging that any half-duplex link exists but is not bottlenecking within the network path or that no half-duplex link exists within the network path, to thereby make a judgment that the first available bandwidth B1 is a one-way available bandwidth of the path.

13. A method of measuring network communication performances, comprising:
  sending a plurality of probing packets at equi-intervals into a network path;
  receiving the plurality of probing packets at the same site on a network from which the probing packets are issued or at the near site on the network;
  measuring transmission time taken for the probing packets to arrive via a path at and return via the path from a specific node within the network determined by the user; and
  estimating a relation of magnitude between a measurement packet sending speed and an available bandwidth in reciprocation of the path, from correlations between the measurement packet transmission times measured, wherein the estimating comprises:
    determining a ratio of the time during which the measurement packet transmission time exhibits a random behavior; and
    judging, if the ratio is large and therefore the measurement packet is considered to be less influenced by queuing, that the sending speed of the measurement packet is smaller than the available bandwidth of the path, to thereby estimate the relation of magnitude in the available bandwidth between the measurement packet and the path.

14. A method according to claim 13, wherein the estimating further comprises:
  finding a ratio giving $$(P/\mu - \delta + \alpha) < \Delta T(i) < -(P-\delta)$$

where P (bit) is a size of the measurement packet, $\delta$ (sec) is a measurement packet sending interval $\mu$ (bps) is a bottleneck link speed on a path to be measured, $\alpha$ is a constant of the order of 0.001 to 0.0000001, and $\Delta T(i)$ is a difference in transmission time between adjacent probing packets, which is defined as $((i+1)^{th}$ measurement packet transmission time$)-(i^{th}$ measurement packet transmission time); and
  judging, if the ratio is large with the consideration of the probing packets being less influenced by queuing, that the measurement packet sending speed is smaller than the path available bandwidth, to thereby estimate the relation of magnitude in available bandwidth between the measurement packet and the path in reciprocation.

15. A method according to claim 13, wherein the sending, the receiving, the measuring, and the estimating are iteratively carried out while varying an initialized transfer speed X (bps) by use of any one of bisection method, regula falsi, monotonically increasing method and monotonically decreasing method, to see whether an available bandwidth of a network path exceeds the transfer speed X (bps) to thereby estimate the available bandwidth of the path.

16. A method according to claim 15, further comprising:
  estimating a first available bandwidth of the network path by the execution of the sending, the receiving, the measuring, and the estimating;
  estimating a second available bandwidth of the network path by allowing differently sized packets to flow through its sending path and return path by the execution of the sending, the receiving, the measuring, and the estimating; and
  estimating a one-way available bandwidth of the network path by judging the state of links within the network path through the comparison of the first and second available bandwidths.

17. A method according to claim 16, wherein the estimating a one-way available bandwidth further comprises:
  judging whether any half-duplex link exists within the network path and whether the half-duplex link, if any, is bottlenecking therewithin; and
  estimating a one-way available bandwidth of the half-duplex link if judgment is made of any one of
    a) any half-duplex link exists and is bottlenecking within the path;
    b) any half-duplex link exists but is not bottlenecking within the path; and
    c) no half-duplex link exists within the path.

18. A method according to claim 16, wherein the estimating a one-way available bandwidth further comprises:
  if a ratio between the first available bandwidth B1 and the second available bandwidth B2 which are estimated with the measurement packet having a size P not less than 4,993 bits is substantially $$B1/B2=(P+4,992)/2P,$$

judging that any half-duplex link exists and is bottlenecking within the network, to thereby make a judgment that 2B1 double the first available bandwidth B1 is a one-way available bandwidth of the path; and
  if $$B1/B2(P+4,992)/2P,$$

judging that any half-duplex link exists but is not bottlenecking within the network path or that no half-duplex link exists within the network path, to thereby make a judgment that the first available bandwidth B1 is a one-way available bandwidth of the path.

19. An apparatus for measuring network communication performances, comprising:
   a sending unit to send a plurality of probing packets at equi-intervals into a network path;
   a reception unit to receive the plurality of probing packets sent from the sending unit;
   a measurement unit to measure transmission time from the start of sending of each of the probing packets by the sending unit up to the completion of reception of each of the probing packets by the reception unit; and
   an estimation unit to estimate an available bandwidth of the network path from correlations between measurement packet transmission times measured by the measurement unit, wherein the estimating unit is further to:
   determine a ratio of the time during which the measurement packet transmission time exhibits a random behavior; and
      judge, if the ratio is large and therefore the measurement packet is considered to be less influenced by queuing, that the sending speed of the measurement packet is smaller than the available bandwidth of the path, to thereby estimate the relation of magnitude in the available bandwidth between the measurement packet and the path.

20. An apparatus according to claim 19, wherein processings of the sending unit, the reception unit, the measurement unit, and the estimation unit are iteratively carried out while varying an initialized transfer speed X (bps) by use of any one of bisection method, regula falsi, monotonically increasing method and monotonically decreasing method, to see whether an available bandwidth of a network path exceeds the transfer speed X (bps) to thereby estimate the available bandwidth of the path.

21. An apparatus according to claim 20, further comprising:
   a first estimation unit to estimate a first available bandwidth B1 of the network path by the execution of processings of the sending unit, the reception unit, the measurement unit, and the estimation unit;
   a second estimation unit to estimate a second available bandwidth B2 of the network path by allowing differently sized packets to flow through its sending path and return path by the execution of the sending unit, the reception unit, the measurement unit, and the estimation unit; and
   a third estimation unit to estimate a one-way available bandwidth of the network path by judging the state of links within the network path through the comparison of the first and second available bandwidths B1 and B2 estimated by the first and second estimation units.

22. An apparatus according to claim 21, wherein the third estimation unit is further to:
   judge whether any half-duplex link exists within the network path and whether the half-duplex link, if any, is bottlenecking therewithin; and
   estimate a one-way available bandwidth of said half-duplex link if judgment is made of any one of
      a) any half-duplex link exists and is bottlenecking within the path;
      b) any half-duplex link exists but is not bottlenecking within the path; and
      c) no half-duplex link exists within the path.

23. An apparatus according to claim 22, wherein the third estimation unit is further to:
   if a ratio between the first available bandwidth B1 and the second available bandwidth B2 which are estimated with the measurement packet having a size P not less than 4,993 bits is substantially $$B1/B2=(P+4,992)/2P,$$

judge that any half-duplex link exists and is bottlenecking within the network, to thereby make a judgment that 2B1 double the first available bandwidth B1 is a one-way available bandwidth of the path; and
   if $$B1/B2(P+4,992)/2P,$$

judge that any half-duplex link exists but is not bottlenecking within the network path or that no half-duplex link exists within the network path, to thereby make a judgment that the first available bandwidth B1 is a one-way available bandwidth of the path.

24. An apparatus for measuring network communication performances, comprising:
   a sending unit to send a plurality of probing packets at equi-intervals into a network path, the plurality of probing packets being designed to reach a predetermined reception site by way of a single or a plurality of predetermined node(s);
   a reception unit located at the predetermined reception site, to receive the plurality of probing packets sent from the sending unit;
   a measurement unit to measure transmission time from the start of sending of each of the probing packets by the sending unit up to the completion of reception of each of the probing packets by the reception unit; and
   an estimation unit to estimate a relation of magnitude between a measurement packet sending speed and a path available bandwidth, from correlations between the transmission times of adjacent said probing packets measured by the measurement unit, wherein the estimating unit is further to:
   determine a ratio of the time during which the measurement packet transmission time exhibits a random behavior; and
      judge, if the ratio is large and therefore the measurement packet is considered to be less influenced by queuing, that the sending speed of the measurement packet is smaller than the available bandwidth of the path, to thereby estimate the relation of magnitude in the available bandwidth between the measurement packet and the path.

25. An apparatus for measuring network communication performances, comprising:
   a sending unit to send a plurality of probing packets at equi-intervals into a network path;
   a reception unit located at the same site on a network where the sending unit is located or at the near site on the network, to receive the plurality of probing packets sent from the sending unit;
   a measurement unit to measure transmission time taken for the probing packets to arrive via a path at and then return via the path from a specific node within the network determined by the user; and
   an estimation unit to estimate a relation of magnitude between a measurement packet sending speed and an available bandwidth in reciprocation of the path, from correlations between the measurement packet transmission times measured by the measurement unit, wherein the estimating unit is further to:
- determine a ratio of the time during which the measurement packet transmission time exhibits a random behavior; and
- judge, if the ratio is large and therefore the measurement packet is considered to be less influenced by queuing, that the sending speed of the measurement packet is smaller than the available bandwidth of the path, to thereby estimate the relation of magnitude in the available bandwidth between the measurement packet and the path.

26. An apparatus according to claim 25, wherein processings of said sending unit, said reception unit, said measurement unit and said estimation unit are iteratively carried out while varying an initialized transfer speed X (bps) by use of any one of bisection method, regula falsi, monotonically increasing method and monotonically decreasing method, to see whether an available bandwidth of a network path exceeds said transfer speed X (bps) to thereby estimate said available bandwidth of said path.

27. A computer readable recording medium having a therein stored network communication performance measuring program, the network communication performance measuring program comprising:
- a sending module for sending a plurality of probing packets at equi-intervals into a network path;
- a reception module for receiving the plurality of probing packets sent from the sending module;
- a measurement module for measuring transmission time from the start of sending of each of the probing packets by the sending module up to the completion of reception of each of the probing packets by the reception module; and
- an estimation module for estimating an available bandwidth of the network path from correlations between measurement packet transmission times measured by the measurement module, wherein the estimation module is further for:
  - determining a ratio of the time during which the measurement packet transmission time exhibits a random behavior; and
  - judging, if the ratio is large and therefore the measurement packet is considered to be less influenced by queuing, that the sending speed of the measurement packet is smaller than the available bandwidth of the path, to thereby estimate the relation of magnitude in the available bandwidth between the measurement packet and the path.

28. A recording medium according to claim 27, wherein the network communication performance measuring program executes processings of the sending module, the reception module, the measurement module, and the estimation module while varying an initialized transfer speed X (bps) by use of any one of bisection method, regula falsi, monotonically increasing method, and monotonically decreasing method, to see whether an available bandwidth of a network path exceeds said transfer speed X (bps) to thereby estimate the available bandwidth of the path.

29. A recording medium according to claim 28, wherein the network communication performance measuring program further comprises:
- a first estimation module for estimating a first available bandwidth B1 of the network path by the execution of processings of the sending module, the reception module, the measurement module, and the estimation module;
- a second estimation module for estimating a second available bandwidth B2 of the network path by allowing differently sized packets to flow through its sending path and return path by the execution of the sending module, the reception module, the measurement module, and the estimation module; and
- a third estimation module for estimating a one-way available bandwidth of the network path by judging the state of links within the network path through the comparison of the first and second available bandwidths B1 and B2 estimated by the first and second estimation modules.

30. A recording medium according to claim 29, wherein the third estimation module is further for:
- judging whether any half-duplex link exists within the network path and whether the half-duplex link, if any, is bottlenecking therewithin; and
- estimating a one-way available bandwidth of the half-duplex link if judgment is made of any one of
  - a) any half-duplex link exists and is bottlenecking within the path;
  - b) any half-duplex link exists but is not bottlenecking within the path; and
  - c) no half-duplex link exists within the path.

31. A recording medium according to claim 30, wherein the third estimation module is further for:
- if a ratio between the first available bandwidth B1 and the second available bandwidth B2 which are estimated with the measurement packet having a size P not less than 4,993 bits is substantially $$B1/B2=(P+4,992)/2P,$$

judging that any half-duplex link exists and is bottlenecking within the network, to thereby make a judgment that 2B1 double the first available bandwidth B1 is a one-way available bandwidth of the path; and
  if $$B1/B2(P+4,992)/2P,$$

judging that any half-duplex link exists but is not bottlenecking within the network path or that no half-duplex link exists within the network path, to thereby make a judgment that the first available bandwidth B1 is a one-way available bandwidth of the path.

32. A computer readable recording medium having a therein stored network communication performance measuring program, the network communication performance measuring program comprising:
- a sending module for sending a plurality of probing packets at equi-intervals into a network path, the plurality of probing packets being designed to reach a predetermined reception site by way of a single or a plurality of predetermined node(s);
- a reception module located at the predetermined reception site, for receiving said plurality of probing packets sent from the sending module;
- a measurement module for measuring transmission time from the start of sending of each of the probing packets by the sending module up to the completion of reception of each of the probing packets by the reception module; and
- an estimation module for estimating a relation of magnitude between a measurement packet sending speed and a path available bandwidth, from correlations between the transmission times of adjacent the probing packets measured by the measurement module, wherein the estimation module is further for:

determining a ratio of the time during which the measurement packet transmission time exhibits a random behavior; and judging, if the ratio is large and therefore the measurement packet is considered to be less influenced by queuing, that the sending speed of the measurement packet is smaller than the available bandwidth of the path, to thereby estimate the relation of magnitude in the available bandwidth between the measurement packet and the path.

33. A computer readable recording medium having a therein stored network communication performance measuring program, the network communication performance measuring program comprising:

a sending module for sending a plurality of probing packets at equi-intervals into a network path;

a reception module located at the same site on a network where the sending module is located or at the near site on the network, for receiving the plurality of probing packets sent from the sending module;

a measurement module for measuring transmission time taken for the probing packets to arrive via a path at and then return via the path from a specific node within the network determined by the user; and an estimation module for estimating a relation of magnitude between a measurement packet sending speed and an available bandwidth in reciprocation of the path, from correlations between the measurement packet transmission times measured by the measurement module, wherein the estimation module is further for:

determining a ratio of the time during which the measurement packet transmission time exhibits a random behavior; and judging, if the ratio is large and therefore the measurement packet is considered to be less influenced by queuing, that the sending speed of the measurement packet is smaller than the available bandwidth of the path, to thereby estimate the relation of magnitude in the available bandwidth between the measurement packet and the path.

34. A record medium according to claim 33, wherein said network communication performance measuring program executes processings of said sending unit, said reception unit, said measurement unit and said estimation unit while varying an initialized transfer speed X (bps) by use of any one of bisection method, regula falsi, monotonically increasing method and monotonically decreasing method, to see whether an available bandwidth of a network path exceeds said transfer speed X (bps) to thereby estimate said available bandwidth of said path.

35. A method for measuring network communication performance, comprising:

estimating an available bandwidth of a network path from correlations between measurement packet transmission times, wherein the measurement packet transmission times are the durations from times of sending a plurality of probing packets at equi-intervals into the network path to times of receiving the plurality of probing packets, comprising:

determining a ratio of time during which the measurement packet transmission times exhibit a random behavior; and judging, if the ratio is large and therefore one of the plurality of probing packets is considered to be less influenced by queuing, that a sending speed of the one of the plurality of probing packets is smaller than the available bandwidth of the network path, to thereby estimate a relation of magnitude in available bandwidth between the one of the plurality of probing packets and the network path.

* * * * *